United States Patent [19]
Horfarter

[11] Patent Number: 5,790,273
[45] Date of Patent: Aug. 4, 1998

[54] METHOD AND APPARATUS FOR PRODUCING A GREY SCALE STENCIL

[75] Inventor: Siegfried Horfarter, Walchsee, Austria

[73] Assignee: Schablonentechnik Kufstein Aktiengesellschaft, Kufstein, Austria

[21] Appl. No.: 678,623

[22] Filed: Jul. 10, 1996

[30] Foreign Application Priority Data

Jul. 10, 1995 [EP] European Pat. Off. ............. 95110759
Apr. 25, 1996 [EP] European Pat. Off. ............. 96106576

[51] Int. Cl.⁶ .................... H04N 1/46; H04N 1/40
[52] U.S. Cl. ................ 358/461; 358/536; 358/456
[58] Field of Search ......................... 358/456–461, 358/534–536, 466, 465, 406; 399/180–181

[56] References Cited

U.S. PATENT DOCUMENTS

| | | | |
|---|---|---|---|
| 4,350,996 | 9/1982 | Rosenfeld | 358/536 |
| 5,305,118 | 4/1994 | Schiller et al. | 358/456 |
| 5,315,406 | 5/1994 | Levien | 358/456 |
| 5,442,461 | 8/1995 | Levien | 358/456 |

FOREIGN PATENT DOCUMENTS

| | | |
|---|---|---|
| 0293214 | 11/1988 | European Pat. Off. . |
| 0359463 | 3/1990 | European Pat. Off. . |
| 2098022 | 11/1982 | United Kingdom . |

*Primary Examiner*—David K. Moore
*Assistant Examiner*—Stephen Brinich

[57] ABSTRACT

Method and apparatus for producing a grey-shade stencil in which a pattern which is bounded by edges is transferred, with a grey-shade grid superimposed on it, into a radiation-sensitive base. The grid is extended continuously over edges of the pattern which come to rest on one another, in order to avoid strips being formed in the area of mutually adjacent edges of pattern reproductions.

28 Claims, 20 Drawing Sheets

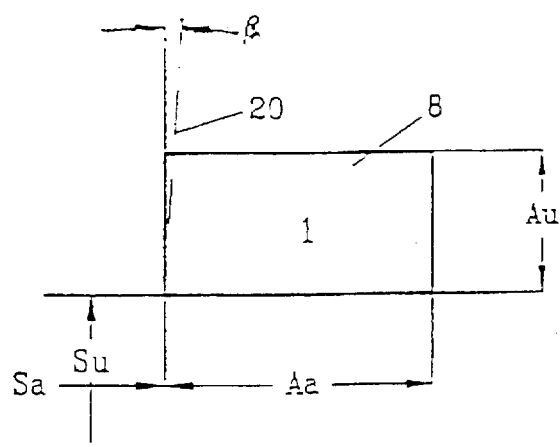
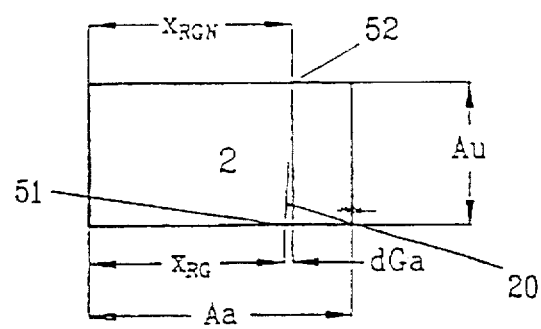
Fig. 18        Fig. 19
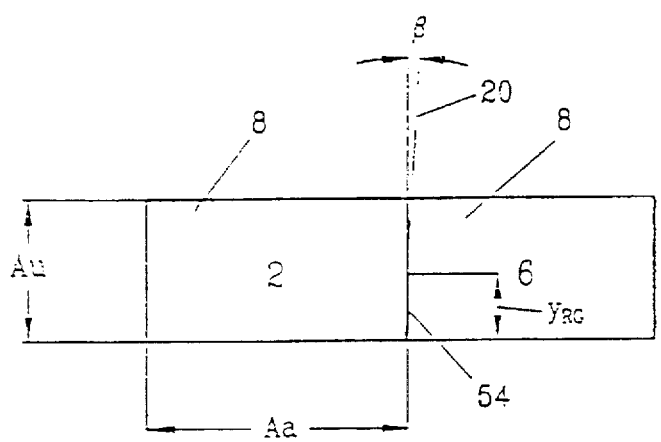
Fig. 20
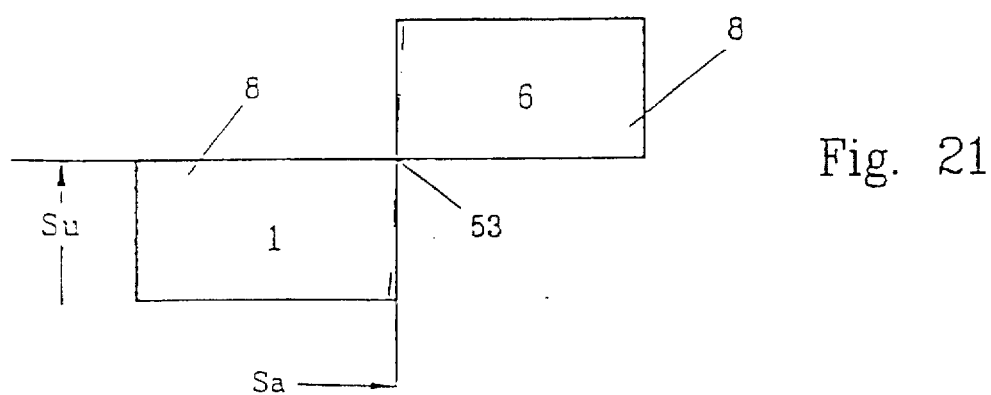
Fig. 21

METHOD AND APPARATUS FOR PRODUCING A GREY SCALE STENCIL

BACKGROUND OF THE INVENTION

Priority for this application is claimed for European Patent Application Nos. 95 110 759.8, filed Jul. 10, 1995, and 96 10 6576.0, filed Apr. 25, 1996. Both of these European patent applications are hereby incorporated by reference.

1. Field of the Invention

The invention relates to a method and apparatus for producing a grey-shade stencil for which a pattern bounded by edges is transferred, with a grey shade grid superimposed thereon, onto a radiation-sensitive base. Such a grey-shade stencil can also be called a half-shade stencil.

2. Description of Related Art

A method of such production has already been disclosed in U.S. Pat. No. 4,350,996. In this patent, a pattern which is bounded by edges is transferred, with a grey-shade grid superimposed on it, onto a radiation-sensitive base in the form of a film, in order to produce a grey-shade stencil. A blank, for example a screen, which is covered by a radiation-sensitive layer can be exposed over a large area via this film in order to obtain a grey-shade stencil.

SUMMARY OF THE INVENTION

It is an object of the present invention to produce better quality grey-shade stencils.

This and other objects may be realized by extending the grid continuously over edges of the pattern which come to rest adjacent to one another.

Such an extension results in it being possible to avoid image strips at the pattern edge and between reproduced patterns which are mutually adjacent to one another. These image strips interfere with the quality of the overall reproduction. If the grid were not extended continuously at the edges of the pattern, then grid openings, for example, could be superimposed there, which would lead to a change in the size of these grid openings and, thus, to the formation of the image strips.

The grid can also be rotated relative to the pattern. This rotation results in, for example, the vertical lines of the grid being inclined through a certain angle with respect to the vertical image edge. The advantage is that, when a plurality of grey-shade stencils are produced with respective grids of different inclination or rotation, the reproductions which are made in multicolor printing using these grey-shade stencils with different grid rotations virtually no longer exhibit any Moiré phenomena or grid interference patterns.

According to an advantageous development of the invention, the continuous extension of the grid is achieved by the grid experiencing an additional fine rotation.

According to another advantageous development of the invention, the continuous extension of the grid, which is rotated relative to the pattern, can also be achieved by compressing or stretching the grid. In this case, the compressing and stretching may also vary in different directions of the pattern. Compression and stretching can also be carried out in addition to fine rotation.

A grey-shade stencil can be produced, for example, by a blank, which is provided with a radiation-sensitive covering layer, being exposed over a large area via a film. In this case, the radiation-sensitive base is the film into which the pattern, which is superimposed from the grey-shade grid, can be incorporated. In this case, a plurality of patterns can be incorporated in the film adjacent to one another, or such that pattern edges of one or more patterns coincide with edges of the film. In the latter case, the film can then, for example, be placed onto the radiation-sensitive covering layer of a cylindrical blank such that the film edges lie adjacent to one another in the circumferential direction. It is always ensured in all these options that the grid always extends continuously over those edges of the pattern which come to rest adjacent to one another, so that strip formation is avoided in the pattern reproduction in the area of these edges.

A grey-shade stencil can also be produced by the pattern, with the grey-shade grid superimposed, being incorporated directly in the light-sensitive covering layer of a blank, i.e., without passing via the film. A suitable beam from a radiation source, for example, a laser beam, can be used for this purpose. The covering layer which lies on the blank will in this case be the radiation-sensitive base.

Thus, patterns lying side by side can also be incorporated in the radiation-sensitive covering layer in this way or, in the case of a cylindrical blank, can be arranged on the outer surface thereof in the circumferential direction and/or in the axial direction such that edges of the pattern are immediately adjacent to one another. In this case as well, the grid, which extends continuously over the pattern edges, ensures that strip formations do not occur between mutually adjacent reproduced patterns.

In principle, grey-shade stencils of any type can be produced using the method and apparatus according to the invention. They can be of planar or cylindrical design. A grey-shade stencil may thus exist, for example, in the form of a cylindrical screen having a uniform perforation, which screen has a lacquer layer on its surface, which lacquer layer has been removed in places, corresponding to the pattern. Alternatively, a grey-shade stencil can be obtained by a lacquer layer initially being applied onto a cylindrical base body with a continuous outer surface, which lacquer layer is removed in places corresponding to the pattern, and a metal, for example nickel, is then applied electrochemically onto the structure thus obtained. Alternatively, the grey-shade stencil may also exist in the form of a gravure or a flexographic printing.

The lacquer layers may be radiation-sensitive covering layers of the type which can be burnt away or vaporized, for example, by radiation of sufficient intensity. These radiation-sensitive covering layers can alternatively contain polymers, such that crosslinking and curing of the exposed areas take place on exposure, after which the unexposed areas can be dissolved away by a development process. Generally, a lacquer layer is a layer for which at least one characteristic of the layer is altered in response to applied radiation.

Direct transfer of the pattern, which has the grey-shade grid superimposed on it, into the radiation-sensitive covering layer which is located on the blank is achieved. Thus, grey-shade stencils can be produced not only with very high quality, but also extremely quickly.

According to a refinement of the invention, the pattern is designed electronically and is stored as a grey-scale table. This results in a relatively high level of freedom to produce patterns as required and to allow them to be changed electronically in a desired manner as well.

According to another refinement of the invention, the pattern can be scanned in lines or columns by, for example, an artistic pattern master in order to store at least parts of lines or columns as a grey-scale table.

In both stored cases, the pattern can be buffer-stored, for example, as a two-dimensional grey-scale table.

An advantageous development of the production according to the invention is distinguished by the fact that the grey-scale table is composed of grey-shade cells which contain a grey-shade value of the pattern for in each case one pattern area assigned to it. In order to transfer the pattern into the case, the radiation-sensitive base is illuminated by a beam along a path, reading out grey-shade values of those grey-shade cells which lie along a corresponding path through the grey-scale table. The grey-shade value in each case read out of a grey-shade cell is compared with at least one reference grey-shade value which is contained in a reference cell, that is assigned to the grey-shade cell, of the grid which is superimposed on the grey-scale table or the pattern. The beam is switched on and off as a function of the comparison result.

In this way, the production can be carried out completely automatically. It is also possible to divide the grey-shade cells into fine cells according to a further refinement of the invention, and a comparison of grey-shade values of the fine cells being carried out with the reference grey-shade value. In this case, grey-shade stencils can be produced with a grey-shade profile which is even more finely graduated.

In a development of the invention, the division of the grey-shade cells into fine cells may be left until the grey-shade cell which is to be read out for the exposure of the radiation-sensitive base is called up. In this way, the requirement for electronic memory space is further reduced, and the production process additionally becomes faster.

The grey-shade values of the fine cells can be predetermined as a function of the grey-shade values of the fine cells of at least one adjacent grey-shade cell, or as a function of the grey scale of at least one adjacent grey-shade cell. Such predetermination has frequently been found to be advantageous for the improvement of the visual impression of reproductions of the pattern which are produced using the grey-shade stencil. The grey-shade values for the respective fine cells thus do not need to be available from the start and be buffer-stored for each grey-shade cell, but can be produced at the instant when they are required, for example, by interpolation or other approximation measures.

It has already been mentioned initially that the production of the grey-shade stencil according to the invention is carried out using a grid. This grid is necessary in order to allow the beam for exposure of the radiation-sensitive base (blank or film) to be switched on and off. If the respective grey-shade values of the grey-shade cells or fine cells of the grey-scale table are compared with the reference grey-shade value of the reference cell or with reference grey-shade values of individual cells belonging to the reference cell, then an appropriate control signal can be produced for switching the beam on and off, depending on the comparison result (greater or smaller). Assuming that this grid comes to rest over the buffer-stored grey-scale table, then this embodiment can be understood in terms of a virtual grid, since the grid does not actually exist at this moment. However, if a grey-shade stencil had been produced using this production, then the grid could also be identified on this grey-shade stencil. The grid itself can be capable of addition or not capable of addition. In the former case, the contents or structures of the grid cells are the same; in the latter case, in contrast, the grid cells may have different contents or structures.

Thus, according to an advantageous refinement of the invention, the reference cell of the grid may be composed of individual cells, at least some of which contain different reference grey-shade values. In this case, the structure of the reference cell is selected such that the individual cells can be addressed via an array $z_x$, $Z_y$, which is initiated twice, in order to read out the reference grey-shade values. The reference cell can, in this case, be regarded as a grid cell of, for example, the grid which may be added. The reference grey-shade values can now rise or fall, for example, in a spiral shape, from the edge of the reference cell towards its center. Once again, this allows a better visual impression to be achieved of a reproduction, produced using the grey-shade stencil according to the invention, of the pattern.

It is also possible to compare each grey-shade value with a sequence of reference grey-shade values. In this case, the respective reference cells may have groups, each having a plurality of individual cells, which contain the same reference grey-shade values in groups.

If the grid is extended continuously over the edges of the pattern, then the coordinates of the individual cells of the reference cell can also be determined by linear transformation of the coordinates of the grey-shade cells or of the coordinates of the fine cells. The idea is that the original relationship is maintained between the grey-shade values of the grey-shade cell or the fine cells on the one hand, and the reference grey-shade values of the reference cell or of the individual cells on the other hand.

According to a further advantageous refinement of the invention, the grid is formed from grid cells which may be added and are, in each case, located within a reference cell which is larger than the grid cell.

As before, the reference cell may be of rectangular or square design, so that the addressing capability for calling up the individual cells via a double index array $z_x$, $z_y$, can be maintained. However, on the other hand, it is now possible to access grid cells which are not rectangular polygons, for example hexagonal grid cells. Even grid cells with a Random structure are possible.

The advantage is that this now provides a further structure for counteracting Moiré phenomena and grid interference patterns, for example, with respect to an already existing screen grid in a blank or with respect to the use of a plurality of grey-shade stencils for multicolor printing.

These and other objects of the present invention will become more readily apparent from detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 18 to 21 shows special cases for intersection conditions of the grey-shade cells;

DETAILED DESCRIPTION OF THE PREFERRED EMBODIMENTS

The exemplary embodiment which is described in the following text relates to the production of screen printing stencils. As already mentioned, other stencils, such as gravure stencils or flexographic printing stencils, can also be produced using the method and apparatus of the invention. During the gravure of screen printing stencils on laser engravers, a focused laser beam is moved over the surface of a screen cylinder which is completely covered, for example, with lacquer. In general, the focus point describes a helical line on the lacquer layer in this case. since, for example, the screen cylinder is caused to carry out a rotary movement and the optics which focus the laser beam are at the same time moved in the axial direction of the screen cylinder. Alternatively, it is possible to engrave in each case one track along a cross-sectional circle of the screen cylinder and then, once a circumferential line has been engraved, to move the gravure head forward by one track width. The heavy concentration of the radiation energy at the focus point burns the lacquer away when the laser beam is switched on and the metallic screen remains underneath the lacquer layer, which now has a corresponding pattern in its outer lacquer layer. The screen is exposed at the points at which the lacquer has been removed, and is permeable for printing inks.

Until now, it has been normal to produce only cylindrical stencils with full grids on such laser engravers. The reason for this was the difficulty of producing gravure information such that the grey shades which appear in a half-shade image (photography) can be transferred reasonably realistically onto a surface which is already provided with a screen structure without Moire effects or other agglomerations of ink dots disturbing the visual impression of the printed image. A graphical pattern master is normally scanned optically with the aid of a scanner. The data are then prepared and stored on a storage medium. After these image data have been processed appropriately, they are used on a laser engraver for the purpose, for example, of engraving a pattern image on a cylindrical screen sleeve which is covered with lacquer. All these processes are controlled by appropriate computers or microprocessors.

In the case of the invention, the image structure is formed first and the grid is then applied in accordance with the grey shades to be modelled. At the same time, the image structure is constructed such that it fits onto the circumference of the screen cylinder with an integer number of uniformly distributed image motifs. In doing so, the formation of visually detectable joins is avoided.

Figure 1:
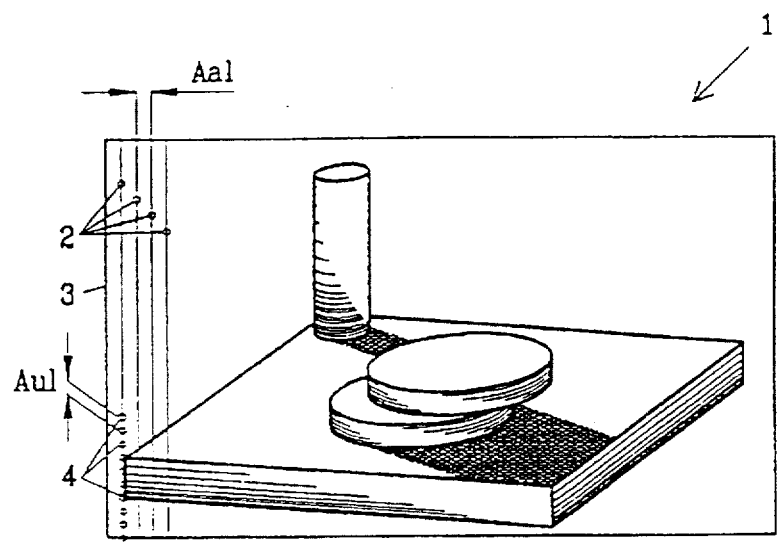
FIG. 1 shows a pattern master which is scanned optically in order to obtain grey-shade values along columns.

FIG. 1 illustrates an original or a pattern master 1 which gives the viewer an impression of real objects in a similar manner to photography, by using different grey shades rather than sharp contours. An image scanner, which is known per se, reads, using an optical read head, along read tracks 2, the grey-shade values which appear at the points on the image.

In this case, the read tracks 2 run parallel to the left-hand image edge 3. During this reading or scanning process, the remission from the read head which is thrown back from an illuminated point 4 on the image is received and passed to a photocell which converts it into an electrical, analog signal. This signal is then converted into a digital signal, for example, by an A/D converter, which is likewise known. The signal may be, for example, a numerical value between 0 and 255 which represents the intensity of the grey or black value present at the point in the image.

In this case, the value 0 is defined for white and the value 255 for deep black. Such points 4 in the image are located at intervals which are defined from the start. They are, of course, not actually applied to the image, but this moves on relative to the read head by the defined height separation Au1 between these read points before and after each reading process. The horizontal distance Aa1 between the read tracks 21 is likewise defined from the start. These distances are expediently selected such that they correspond to those distances which can sensibly be used in the gravure of the grey-shade stencil which will be carried out later. Thus, for example, it is sensible to select these distances to be 50 or 100 μm, for example, since a focus diameter of 70 to 100 μm can be achieved for gravure with the aid of a $CO_2$ laser and it therefore does not make much sense to place the gravure lines closer. On the other hand, the focus diameter can be increased to about 200 μm at any time and is also sensible for certain applications. The distances Aa1 and Au1 then increase correspondingly. The grey-shade values determined in the manner described are now stored in a storage medium, such as on a magnetic storage disk or in a RAM area, which has a suitably large size, of a computer.

Figure 2:
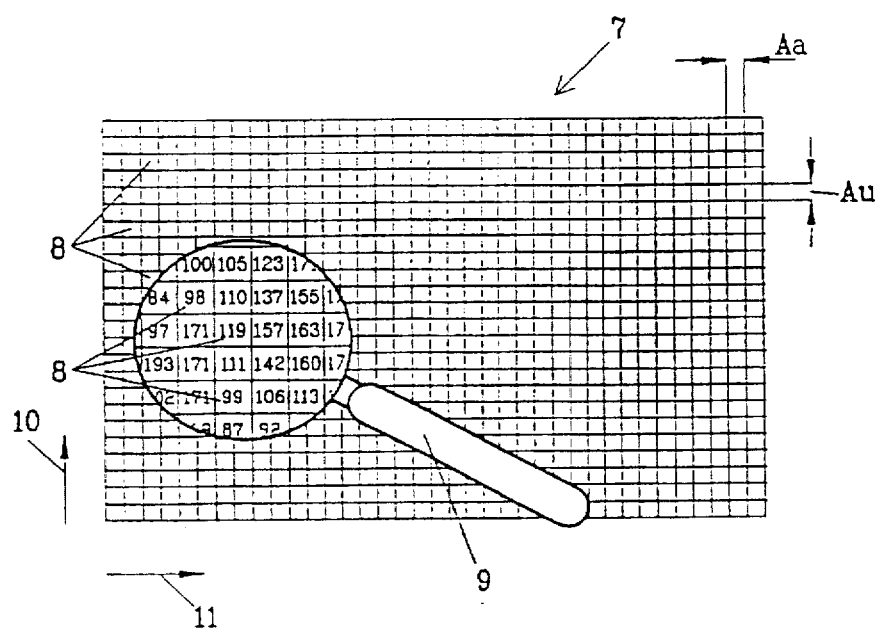
FIG. 2 shows a grey-scale table, which is constructed in a corresponding manner to the scanned pattern master and has grey-shade cells which each contain one of the scanned grey-shade values of the pattern master.

This storage is illustrated symbolically in FIG. 2. FIG. 2 to symbolize a memory area, which will be referred to as the grey-scale table 7 in the following text. This grey-scale table 7 contains a numerical value or grey-shade value in each of its individual memory cells or grey-shade cells 8, respectively, which corresponds to the remission of the associated points 4 on the image and is a measure of the grey-shade of the point 4 on the image. On the basis of the assumption which has already been made, these values are between 0 and 255.

In order to illustrate the contents of the grey-shade cell 8 better, a part of the memory—that under the magnifying glass 9—is enlarged. The grey-shade image of the pattern master 1 which has been read and is stored in the grey-scale table 7 still need not match the circumference and length of the screen cylinder in any way. The stored pattern master 1 is thus applied to the circumference of the screen cylinder either enlarged or else repeated a plurality of times.

Both measures may possibly be used. By combining these measures, it is always possible to fill the circumference of the screen cylinder without any gaps. Multiple repetition or pattern addition is also possible in the axial direction 11 of the screen cylinder if the width of the stored pattern master 1 or of the grey-shade image is less than the length of the screen cylinder. Whether the magnification factor in the axial direction 11 can also be kept different from that in the circumferential direction 10 depends on the pattern or motif to be represented.

Figure 3:
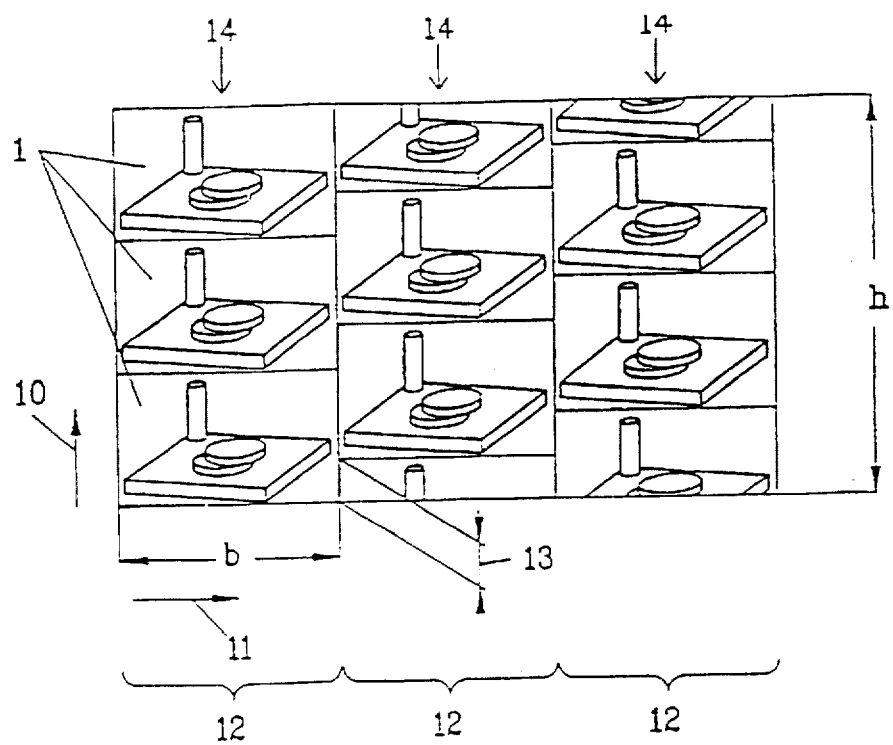
FIG. 3 shows additive images, which are each composed of a plurality of pattern masters, on a screen cylinder.

FIG. 3 shows such a grey-shade image with multiple additions. The pattern masters 1 are applied, appropriately enlarged or reduced, a plurality of times in the circumferential direction 10 within a longitudinal section 12. Identical longitudinal sections 12 are applied a plurality of times in the axial direction 11, being in each case offset relative to one another by the offset distance 13 in the circumferential direction. The offset distance 13 will be used later in the formulae and is designated by the symbol v there; it may be selected to be as large as desired, or may be zero.

The image which is located within a longitudinal section 12 and is produced by an addition of pattern masters 1 in the circumferential direction is called the additive image 14 in the following text. The height of such an additive image 14 corresponds to the circumference h of the screen cylinder to be engraved. The additive image 14 does not now need to be fixed in the same manner as the pattern master 1 at all, since all the grey-shade values are actually already stored in the grey-scale table 7. It is sufficient to note the number of repetitions in the circumferential direction, by which the additive image 14 is unambiguously defined, together with the grey-scale table 7. Final dimensions Aa in the axial direction 11 and Au in the circumferential direction 10 can now be ascribed to each grey-shade cell 8 in the grey-scale table 7. These dimensions correspond to the read intervals Aa1 and Au1, multiplied by the enlargement or reduction factor applicable to the respective direction.

Figure 4:
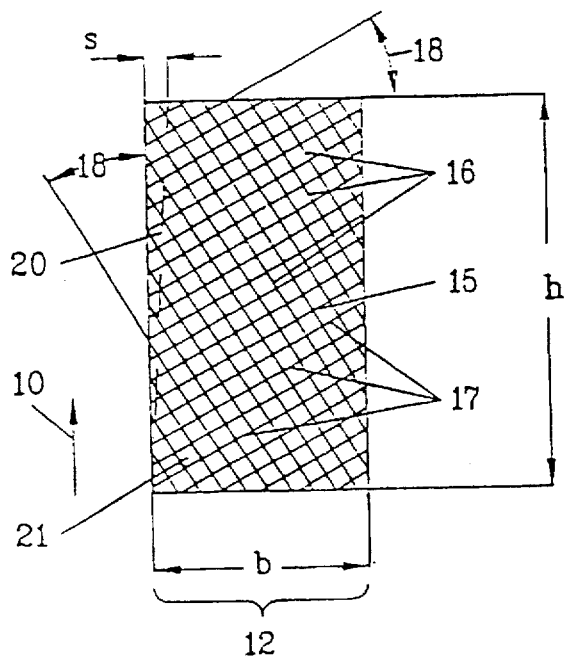
FIG. 4 shows a square, virtual grid which is superimposed on one of the additive images according to FIG. 3.

FIG. 4 shows a square virtual grid 15 which is superimposed on a longitudinal section 12, i.e., on an additive image 14, and on the basis of which those conditions are defined for grid application which will give a viewer the impression of a grey-shade image in the subsequent printed image. This grid can be defined independently of the width b of the additive image 14. The grid application need then only take place during the gravure work. The term "on fly" grid application is used in this case. In this procedure for applying a grid to an image, the grid is dragged along continuously in the longitudinal direction, but independently of the image width b.

Alternatively, the grid can be formed such that it is repeated precisely with the width b of the additive image. This will be expedient in particular when all the information, i.e., not the information relating to the simple pattern master 1, but that relating to the grey-shade image with the grid on it, is stored in a dedicated work file and is read out by repeatedly reading from this work file during the gravure, and is converted into gravure commands. In this case, affine distortion of the grid is generally necessary in order that the grid not only matches the circumference of the screen cylinder precisely in the circumferential direction 10 but also matches the width b of the additive image with the same accuracy. This width is also called the longitudinal repeat.

When the grid is applied by a computer, the virtual grid 15 is implemented only by a single grid cell (reference cell) of this grid. This means that only the contents of one grid cell 21 are stored in or on a suitable medium (RAM, hard disk) separately from the pattern master 1, and likewise separately from the additive image 14. This is also the reason why it is called a virtual grid. The contents of the grid cell 21 are grey-shade values which are defined in appropriate graduations for a large number (64 to 6400) of subregions of the grid cell 21. This will be described in more detail later.

The network lines 16 and 17 of the virtual grid 15 can be aligned at any desired angle 18 with respect to the left-hand image edge 3 and the upper image edge 19. As a result of the free selection of this angle, Moiré phenomena in the printed image produced when the printing stencil produced in accordance with the invention is suppressed. Such Moire phenomena occur in the case of a stencil when repeating structures (grey-shade grid application) have other periodic structures (screen structure) superimposed on them. This effect becomes stronger when the printed images of a plurality of such stencils are superimposed (multicolor printing, trichromatic printing). Such Moiré phenomena can be suppressed if the stated angle 18 on the stencils in a pattern set is selected at random and, above all, to be different from one another.

One of the initially mentioned helical lines 20 along which engraving is carried out is shown on the in FIG. 4 over the virtual grid 15. The inclination of the helical line 20 with respect to the circumferential direction 10 is very small and, to be precise, the tangent of the inclination angle of the helical line 20 corresponds to the quotient of the feed s divided by the circumference of the screen cylinder h (580 to 1000 mm). The order of magnitude of the feed s is selected to be the same as the width of the gravure line and this, in turn, corresponds to the diameter of the laser beam at the focus point (about 70 to 100 μm).

Although it was noted above that the angle 18 can be selected as desired, this is subject to a minor limitation. The inclination of the grid must be corrected, even if this is to a very minor extent. An error point in the form of a dark or bright line will become visible to a viewer at that point on the circumference of the screen cylinder at which the edges of the additive image 14 abut later in the gravure image, if the grid does not fit, that is to say if the grid does not merge into itself with point accuracy at the abutment point.

Figure 5:
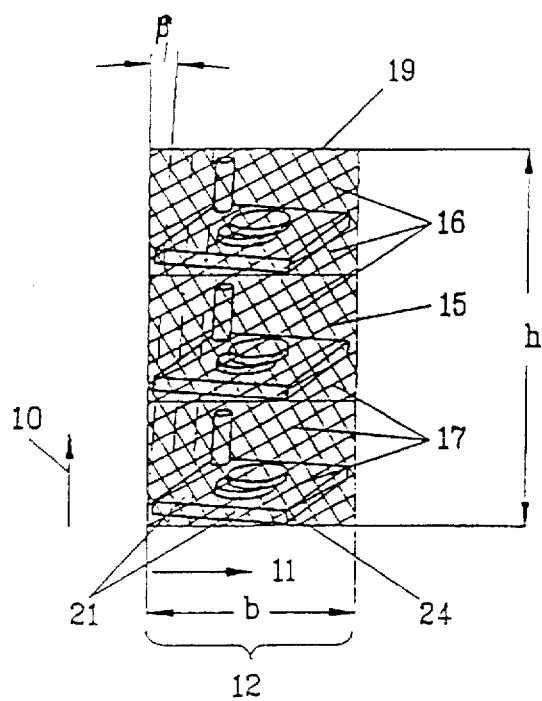
FIG. 5 shows a pattern which is produced using gravure and on which the virtual grid is superimposed.

FIG. 5 shows the pattern which is produced during gravure and on which the virtual grid 15 is superimposed. Since the areas of the pattern which were originally parallel to the image edge are here shown obliquely with the inclination caused by the helical line 20 with respect to the circumferential direction 10, the pattern on the screen cylinder surface is slightly distorted. In the case of an exemplary embodiment, this distortion angle is:

$$\beta=0.1/(580 \text{ to } 1000)=0.00002 \text{ to } 0.00001 \text{ rad}$$

This is a good mean value for normal distortion. Such small distortion is irrelevant for many printing purposes. The illustration of the distortion in FIG. 5 is greatly emphasized in order to illustrate the situation. However, the important point is that only the distortion of the image contents is of minor importance, but not faults which can occur at those points in the gravure image at which the image edges of the additive image 14 abut. These faults are caused by a completely random position of the network lines 16 and 17 of the virtual grid 15 which is used for the purpose of half-shade generation. In the case of gravure of cylindrical screen cylinders, the additive image which is provided with grid information must be applied once over the circumference h of the screen cylinder to be engraved. At the points where the lower gravure image edge 24 abuts against the upper gravure image edge 19, grid cells 21 which are intersected randomly by the image edges on the screen cylinder would then meet one another, as a result of which visible gravure faults would occur in the printed image.

Thus, although the requirement was stated earlier that the network lines 16 and 17 of the grid 15 can be arranged at any selectable angle 18 with respect to the image edges, this requirement now needs to be subject to a certain limitation. If the grid is moved by the circumference h of the screen cylinder, then the grid must be joined without errors at the connecting point resulting from this. However, the requirement which has just been stated can always be satisfied, and virtually without any limitation in the free selection of the angle, if very minor rotation and similar scaling, i.e., expansion or compression, of the grid are allowed.

Figure 6:
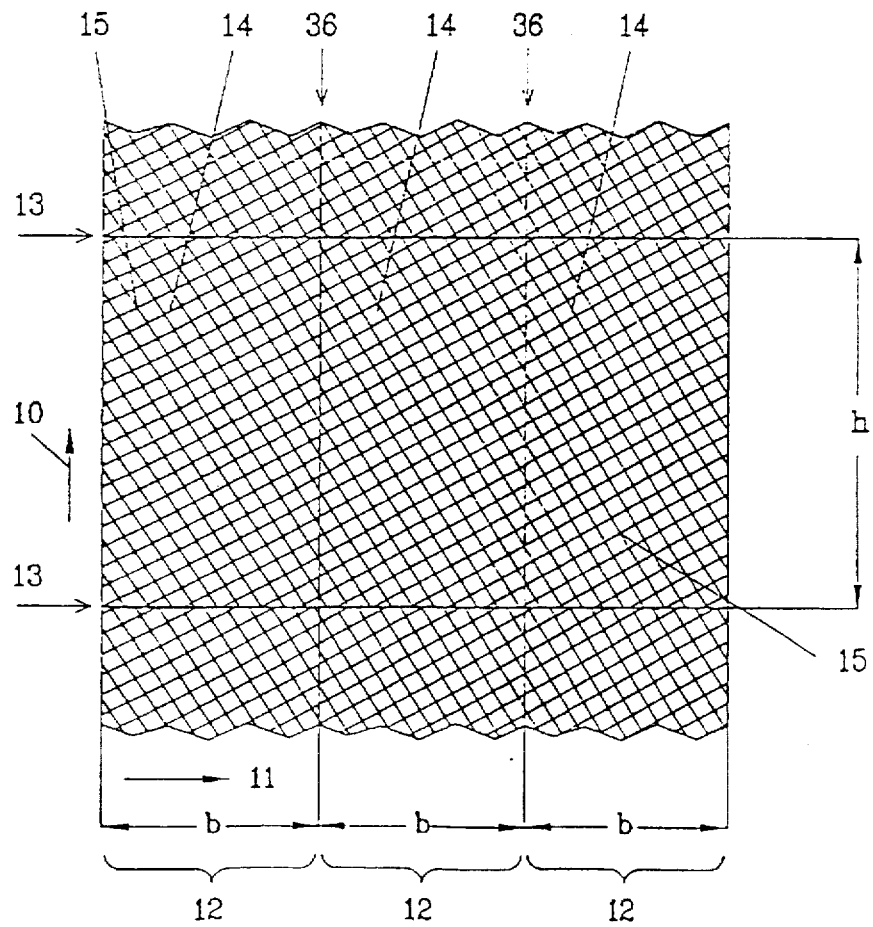
FIG. 6 shows grids which are on the circumference of a screen cylinder and do not match one another at the upper and lower image edges.

FIG. 6 illustrates a grid 15 which does not match together at the abutment point 13 of the lower image edge 24 and the upper image edge 19. Very minor distortion (rotation and scaling) of the grid is sufficient to avoid these faults. The grid 15 is continuously dragged onwards in the longitudinal direction 11 at the abutment points 36 in the case of the "on fly" grid application method, so that no grid application error at all occurs here. This means that the grid 15 does not have the image width b of the additive image 14 as the longitudinal repeat, but that its longitudinal repeat is completely independent of this width b.

Figure 7:
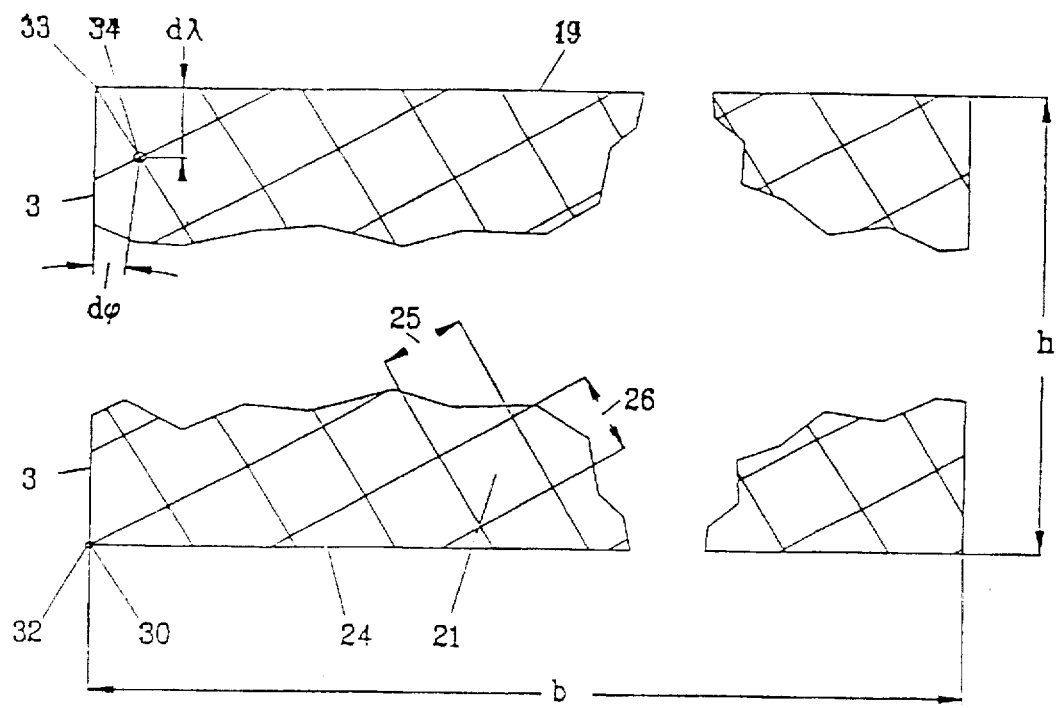
FIG. 7 shows correction of the grid at an abutment point between the upper and lower image edge.

The way in which the distortion (scaling and rotation) which is required to correct the grid application errors in the circumferential direction 10 will be explained with reference to FIG. 7. In the case of this method, the errors are corrected at the abutment point between the lower and upper limit edge. The distortion of the grid with respect to the circumference h of the screen cylinder and the width b of the additive image 14 (=longitudinal repeat) need never be greater than the dimensions 25 and 26 of a grid cell 21. FIG. 7 illustrates image details close to the upper image edge 19 and the lower image edge 24 of the additive image 14. The grid has in this case been arranged such that a grid network point 30 coincides with the left-hand lower corner point 32 of the additive image 14. Another adjacent grid network point 34 is sought close to the left-hand upper end point 33 of the additive image 14.

The direction of the connection from the corner point 32 to the grid network point 34 includes an angle $d\phi$, then this grid network point 34 comes to rest precisely on the edge 3. In general, the grid network point 34 will now not yet coincide with the corner point 33, but will be at a distance $d\lambda$ from it. The grid is thus now scaled, i.e., enlarged or reduced, until the grid network point 34 coincides with the corner point 33. This process results in the small correction rotation angle $d\phi$ and a correction zoom factor, which is very close to the value 1, for the grid. The correction zoom factor is:

$$Zf=h/(h-d\lambda)$$

In this case, $d\lambda$ is to be made positive when the grid network point 34 is between the corner points 32 and 33 after the rotation of the grid. If the selected grid network point is outside this range, then $d\lambda$ must be made negative. If this distortion correction, which is composed of the rotation $d\phi$ and the scaling, is applied to the entire grid 15, then the requirement for error-free matching of the grid at the upper and lower image edge is satisfied, provided these edges abut.

Figure 8:
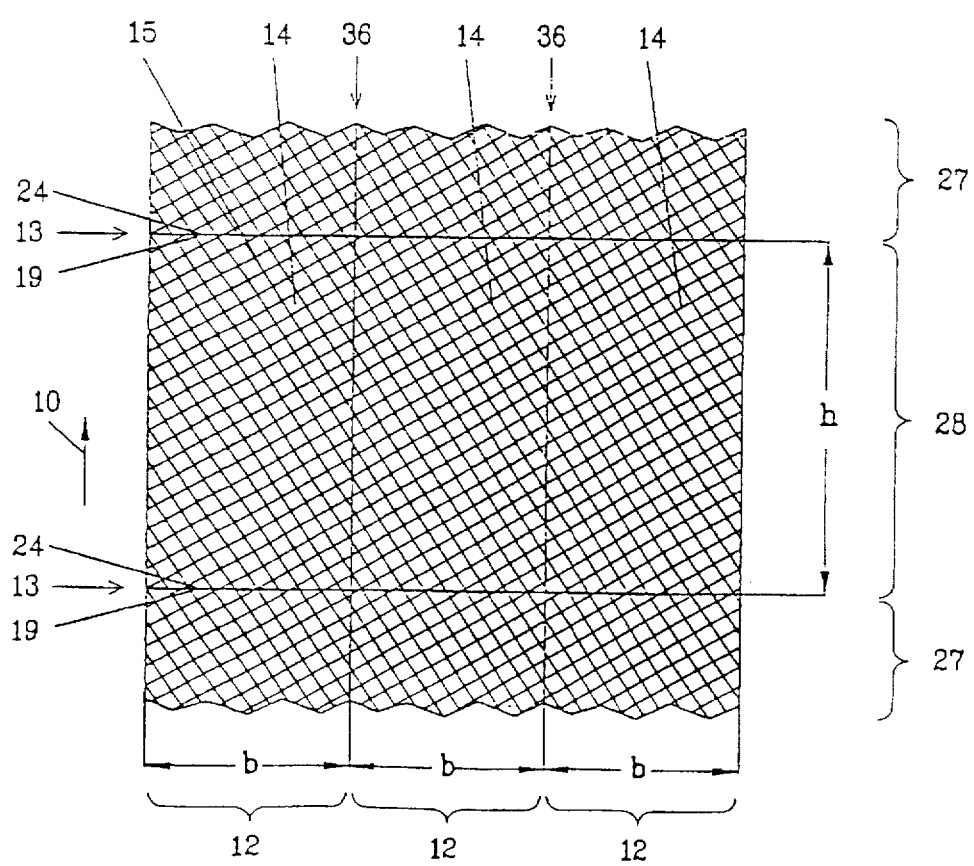
FIG. 8 shows grids which are corrected in the area of the upper and lower image edges such that they no longer exhibit any discontinuities there.

This situation is illustrated in FIG. 8. The areas 27 at the lower and upper image edge are actually a repetition of the inner area 28 of this illustration and they are therefore shown in the develop illustration of the actual, cylindrical surface of the screen cylinder to demonstrate the matching of the grid. The different position s of the grid at the lower corner points of the abutment points 36 can also be seen from this illustration, which position s results from the repeated joining together of the additive image 14 in the longitudinal direction 11. Correct matching of the grid at the abutment points 36 is achieved, with the grid at the same time being in the identical position at all the abutment points 36, if the distortion of the grid which has been formed until now from a very small rotation and a zoom is replaced by complete affine distortion of this virtual grid 15.

In this way, the entire pattern, including the grid information, can be processed in an additive manner, can then be stored in a memory of appropriate size, and, finally, can be used from there without any further computational measures for grid application during the gravure. It is still necessary to use the circumferential offset which was originally used for processing for each new longitudinal addition. This grid-processing method is called the affine preliminary grid method.

Figure 9:
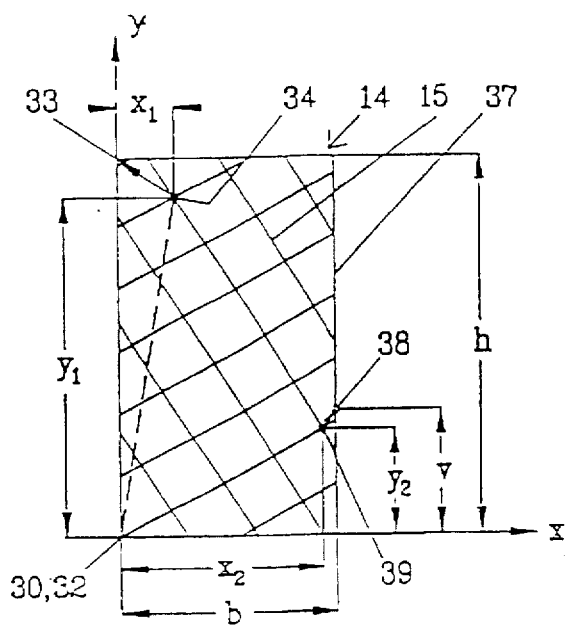
FIG. 9 shows correction of the grid by affine distortion.

The way in which the affine distortion is carried out will be described with reference to FIG. 9. Once again, the grid 15 is also shifted here such that a grid network point 30 coincides with the left-hand lower corner point 32 of the additive image 14. The corner point 33 is located on the left, at the upper edge. The grid network point 34 is closest to this corner point 33. After what has been stated so far, it is already clear that the grid 15 must be distorted such that the grid network point 34 coincides with the corner point 33. In addition, the grid is now intended to match at the right-hand edge 37 as well, when the same image detail is attached.

This matching necessitates the repeat connection point 38 which is located at the right-hand edge 37 and is offset by the distance v in the circumferential direction being a grid network point in the same way as the initial point 32. The grid network point 39 is closest here. The grid must now additionally be distorted such that this grid network point 39 coincides with the repeat connection point 38.

It is furthermore necessary that all the distortion be carried out linearly so that the individual grid points are at uniform distances from one another even after the distortion. If a coordinate system is used such that the origin thereof coincides with the corner point 32 of the additive image 14, the y-direction coincides with the left-hand image edge 3 and the x-direction coincides with that of the lower image edge 24, then the coordinates of the point in the image which define the distortion are governed by the following:

The coordinates of the two grid network points 34, 39 of the undistorted grid 15 are:

grid network point 34: $x_1$, $y_1$
grid network point 39: $x_2$, $y_2$

The coordinates of the points with which these two grid network points are intended to coincide are:

corner point 33: 0, h,
repeat connection point 38: b, v

A linear coordinate transformation which is suitable for solving the object under consideration is given by:

$$x = a_x \cdot x_p + a_y \cdot y_p \quad \text{(TG)}$$
$$y = b_x \cdot x_p + b_y \cdot y_p$$

with the still unknown transformation coefficients $a_x$, $a_y$, $b_x$, $b_y$.

If this transformation rule is applied to the points to be transformed, then the following four equations are obtained:

$$0 = a_x \cdot x_1 + a_y \cdot y_1$$
$$h = b_x \cdot x_1 + b_y \cdot y_1 \quad \text{(AB)}$$
$$b = a_x \cdot x_2 + a_y \cdot y_2$$
$$v = b_x \cdot x_2 + b_y \cdot y_2$$

These last four equations make it possible to derive the four unknown coefficients $a_x$, $a_y$, $b_x$, $b_y$ and, finally, using these coefficients, the coordinates of all the other grid network points in the transformed grid using the relationships (TG). It follows from the solution of (AB), for these coefficients that:

$$a_x = \frac{b \cdot y_1}{x_1 \cdot y_2 - x_2 \cdot y_1} \quad \text{(KF)}$$
$$a_y = \frac{b \cdot x_1}{x_1 \cdot y_2 - x_2 \cdot y_1}$$
$$b_2 = \frac{v \cdot y_1 - h \cdot y_2}{x_1 \cdot (y_1 - y_2)}$$
$$b_y = \frac{h - v}{y_1 - y_2}$$

During the gravure of the screen cylinder, the helical line 20 is in reality located in the affine-distorted grid 15. Since, as will be described later, one cell in this grid will be used as a square cell as would actually correspond only to the undistorted grid, the helical line 20, or at least individual points on it, must be formed by a transformation, which is the inverse of (TG) into the representation of the undistorted grid image. The following expressions for this inverse transformation are obtained from (TG) by solving for $x_p$, $y_p$:

$$x_p = \frac{x \cdot b_y - y \cdot a_y}{a_x \cdot b_y - b_x \cdot a_y} \quad \text{(IT)}$$
$$y_p = \frac{y \cdot a_x - x \cdot b_x}{a_x \cdot b_y - b_x \cdot a_y}$$

In these expressions, x and y are the coordinates of a distorted grid network point, and $x_p$, $y_p$ are the coordinates of an undistorted grid network point. If the coordinates of the actual end points of a helical line 20 are substituted for x and y, then the coordinates, distorted on a square grid, of this helical line end points are obtained for $x_p$, $y_p$ and, using $$\overline{\infty} = \arctan\left(\frac{x_p}{y_p}\right) \quad \text{(W1)}$$

The angle of this distorted helical line with respect to a network line family 16, 17, which will have to be taken into account in the determination of the half-shade values, which will be described later.

Figure 10:
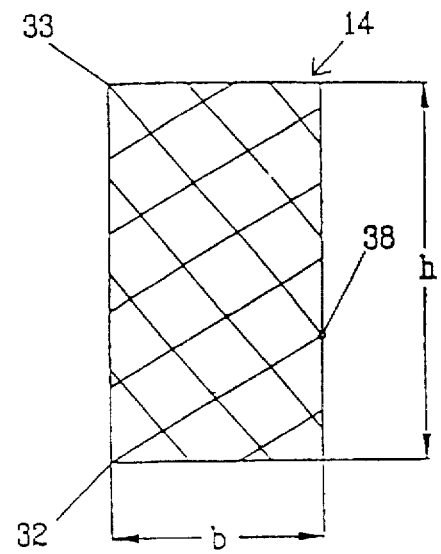
FIG. 10 shows the affine-distorted grid within a single additive image.
Figure 11:
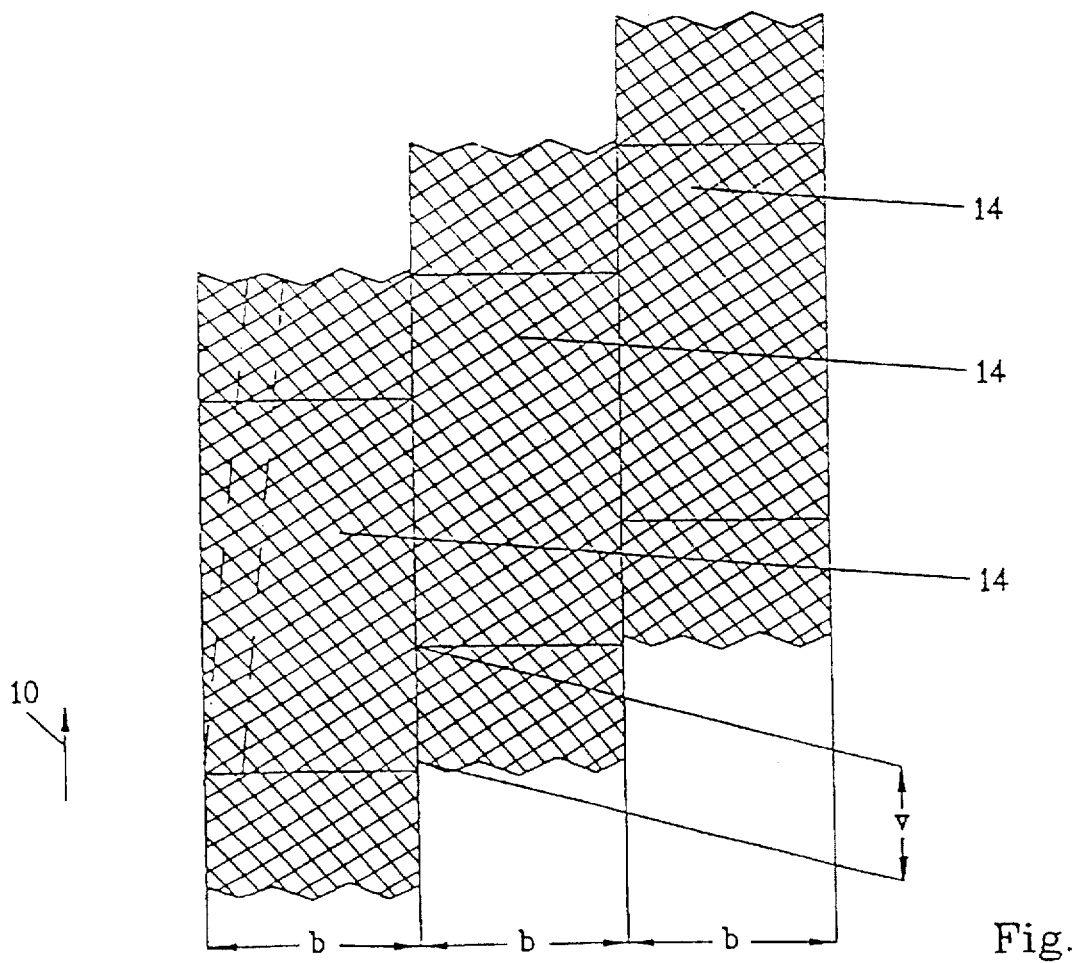
FIG. 11 shows a grid image obtained by using the grid according to FIG. 10 by joining together the additive images, which are on a grid, in the longitudinal direction of the screen cylinder, the circumferential offset of the grid being taken into account for each addition.

FIG. 10 shows the affine-distorted grid within a single additive image 14 and FIG. 11 shows the resulting grid image when the additive images, with the grid applied, are joined together in the longitudinal direction of the screen cylinder, account being taken of the circumferential offset v in each addition. The grid of an additive image 14 correctly fits the adjacent additive image 14 at all four edges.

So far, only the matching of the grid at the abutment points of the image details to be joined to one another has been described. However, a further important technical measure is the formation of that digital information which, on the one hand, makes it possible to control the color intensity of the printed image corresponding to the grey shading of the pattern master 1 and, on the other hand, the connection, which is independent of the longitudinal repeat, of the grid to the preceding additive image, as well.

Figure 12:
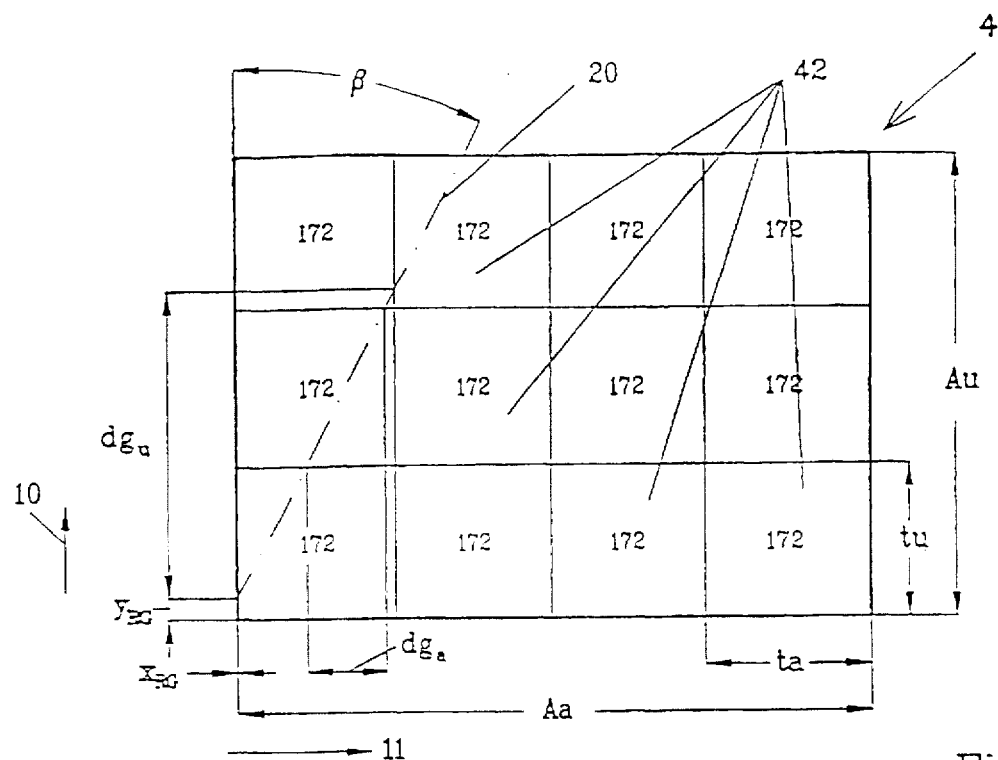
FIG. 12 shows the division of a grey-shade cell into fine cells.

Each grey-shade cell 8 in the grey-scale table 7 in FIG. 2 is divided into fine cells for this purpose. This is illustrated in FIG. 12. A circumferential resolution and a longitudinal resolution are defined which are finer than that which would correspond to the intervals Au between the read points 4 and the intervals Aa between the read lines 2 which were used as the basis for the grey-scale table 7. The intervals Au and Aa may be regarded as dimensions of an imaginary grey-shade cell 8, which is transferred onto the circumference of the screen cylinder, from the grey-scale table 7 or the additive image 14. The circumferential resolution and longitudinal resolution mentioned above are not selected completely arbitrarily, but depend on empirical values which have to correspond to the respective fineness of the mesh width of the screen cylinder. The user can choose between a fine, medium and coarse resolution. The following Table I contains typical values for this:

TABLE I

| Screen fineness of the stencil [openings/in] | Resolution | Coarse Grid [lines/cm] | Horizontal resolution [points/mm] | Vertical resolution [points/mm] | Angle [degrees] |
| --- | --- | --- | --- | --- | --- |
| 60 | medium | 13.5 | 10 | 30 | 15 |
| 80 | medium | 16.6 | 10 | 30 | 15 |
| 80 | fine | 53.9 | 21 | 50 | 15 |
| 105 | medium | 20.95 | 15 | 30 | 15 |
| 125 | fine | 27.0 | 13.33 | 30 | 15 |
| 125 | medium | 22.2 | 8.0 | 30 | 15 |

TABLE I-continued

| Screen fineness of the stencil [openings/in] | Resolution | Coarse Grid [lines/cm] | Horizontal resolution [points/mm] | Vertical resolution [points/mm] | Angle [degrees] |
|---|---|---|---|---|---|
| 125 | coarse | 15.77 | 7.76 | 30 | 15 |
| 135 | coarse | 16.6 | 10 | 30 | 30 |
| 155 | fine | 31.8 | 20 | 20 | 30 |
| 155 | medium | 27.7 | 13.333 | 30 | 30 |
| 155 | coarse | 19.5 | 12.3 | 30 | 30 |
| 165 | fine | 36 | 19.1 | 30 | 30 |
| 165 | medium | 29 | 14 | 30 | 30 |
| 165 | coarse | 20.8 | 13.511 | 30 | 30 |
| 185 | fine | 40 | 19.38 | 30 | 30 |
| 185 | coarse | 23.34 | 16.9 | 30 | 30 |
| 195 | fine | 39.1 | 19.7 | 30 | 30 |
| 195 | coarse | 23.34 | 19.7 | 30 | 30 |

The divided grey-shade cell 41, which corresponds to the grey-shade cell 8, in FIG. 12 is in this case divided, for example, three times in the circumferential direction and four times in the longitudinal direction the basis of such table details. The grey-shade cell 41 is given the dimensions Au and Aa of the grey-shade cells 8 from the grey-scale table 7. The fine cells 42, having the dimensions $t_u$ and $t_a$, are obtained as a result of the division. The same grey-shade value which was included in each grey-shade cell 8 in the grey-scale table 7 (original value) and from which the grey-shade cell 41 is derived is entered in each of these fine cells 42.

The grey-shade values in the fine cells 42 are now compared with the reference grey-shade values which are entered in the reference cell 46 (FIG. 15) of the virtual grid 15. This reference cell 46 of the virtual grid 15 will be described in more detail in the discussion of FIGS. 14 and 15.

Figure 13:
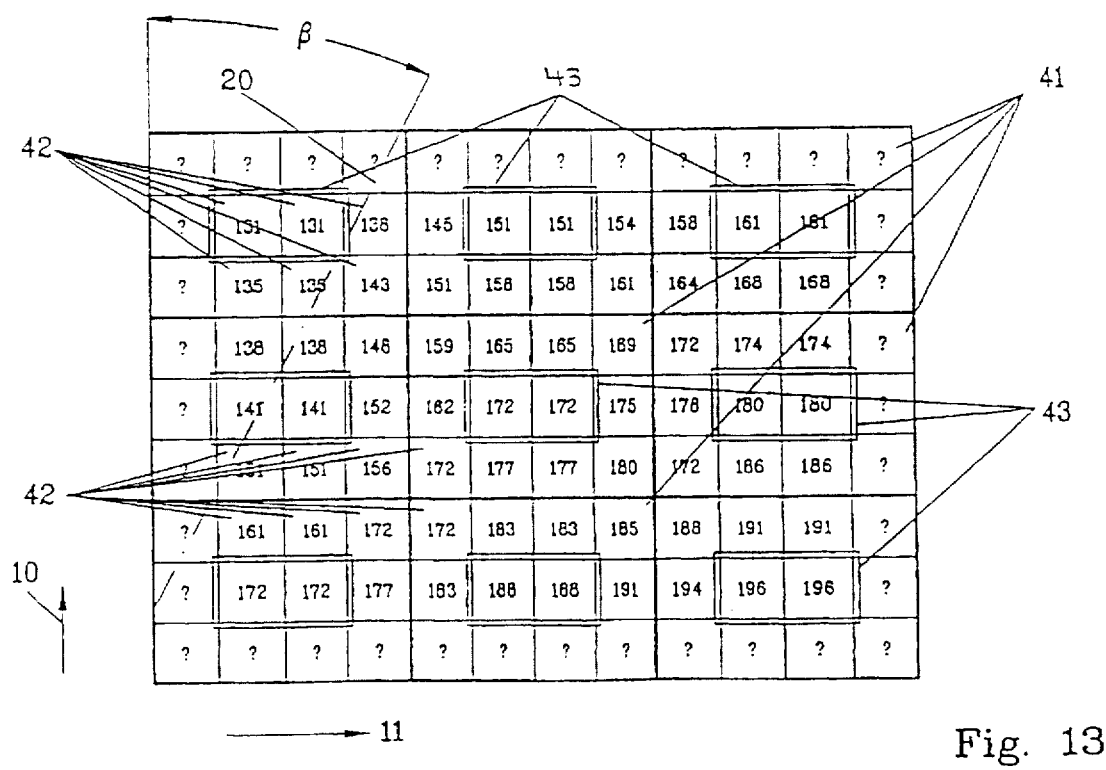
FIG. 13 shows how grey-shade values are obtained for the respective fine cells according to FIG. 12 by interpolation.

In principle, the grey-shade values in the fine cells 42 of the grey-shade cell 41 could also be obtained by interpolation. This is shown in FIG. 13. In this case, the original values would be entered only in the fine cells 42 which are at the center 43 of the grey-shade cell 41. Those fine cells 42 which are located at the edge of the grey-shade cell 41 contain values which are obtained from interpolation using values of the adjacent grey-shade cells 41. However, since the grey-shade cell 41 in the case of "on fly" grid application is not produced until the instant of gravure, either considerable processor speeds are required in the case of interpolation of the grey-shade values, or the gravure speed must be reduced. In addition, considerable quantities of data must be kept available in the RAM of the control computer not only for the circumferential row that is currently to be engraved, but also for the adjacent circumferential rows. It is therefore advantageous in this case to operate with affine preliminary grid application.

Figure 14:
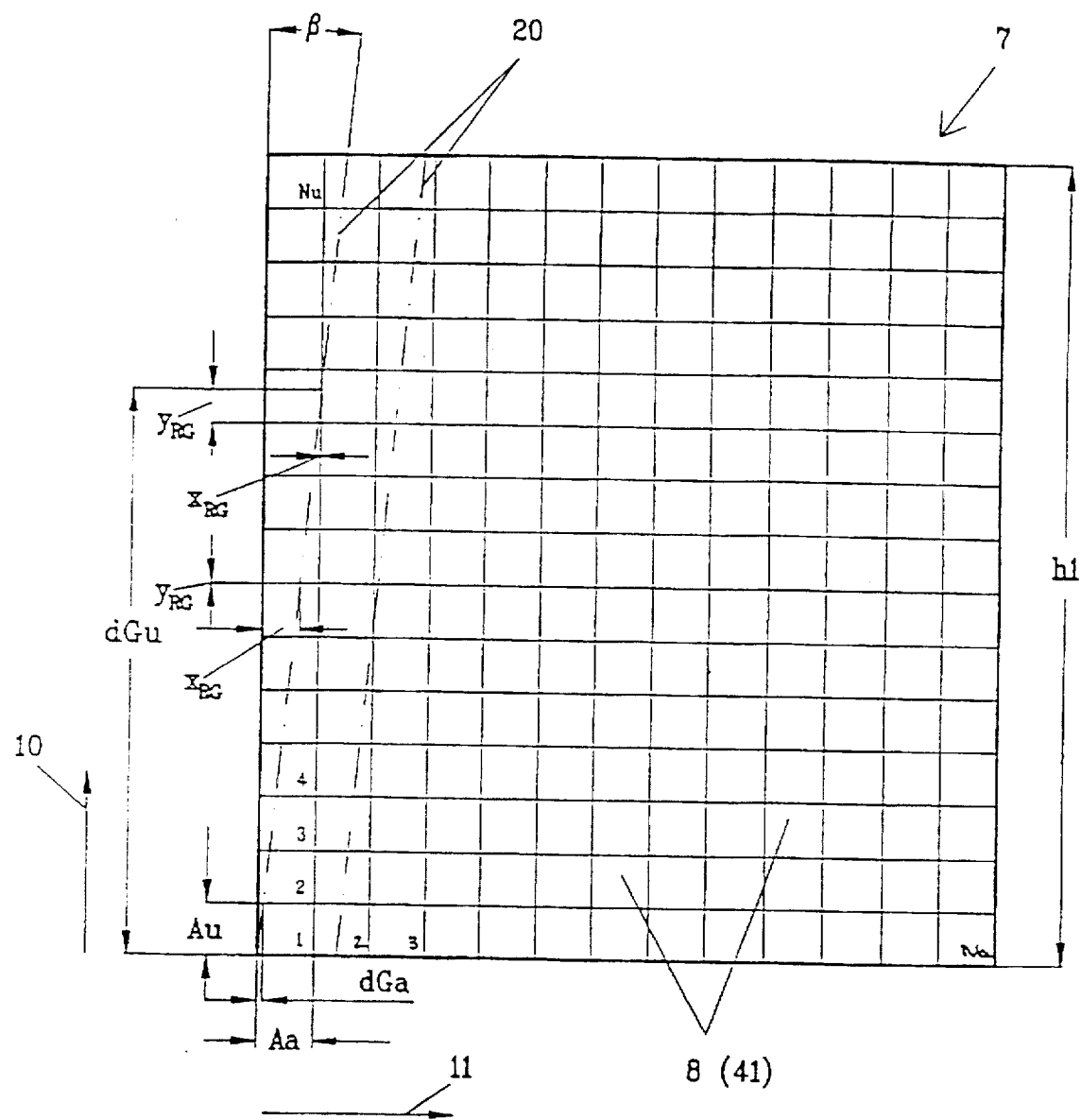
FIG. 14 shows how exposure and grid formation are carried out on a blank.

FIGS. 12, 13 and 14 show a helical line 20 at the already known inclination angle β with respect to the circumferential direction 10. The determination of this inclination angle has been discussed in conjunction with FIG. 5. Four step values, which are essential for the development of the grid application method, can be taken from the figures, namely $dG_u$, $dG_a$, $dg_u$, and $dg_a$. These values are given by:

$$dG_u = \frac{Aa}{\tan(\beta)}$$ (SW)

$$dG_a = Au*\tan(\beta)$$

$$dg_u = \frac{t_a}{\tan(\beta)}$$

$$dg_a = t_u*\tan(\beta)$$

FIG. 14 shows the implementation of the grid application method. The grey-scale table 7, with its grey-shade cells 8 and 41, is shown here. The size of the grey-scale table 7 in the circumferential direction is h1. A first helical line 20 is located with its initial point at the left-hand lower corner of the first cell of the first additive image 14 or, which is identical to this, at the left-hand lower corner of the first cell of the grey-scale table 7 (FIG. 2). In the grey-scale table 7, there are Nu=h1/Au cells in the circumferential direction and Na=b/Aa cells in the axial direction. Whenever the helical line 20 intersects the boundary of a grey-shade cell 8 in the grey-scale table 7 for the first time, the fine cells 42 of the grey-shade cell 41 are filled with new values, to be precise with those which correspond to the grey-shade value in the cell 8 which is being intersected for the first time.

In addition, the precise distances are calculated between the intersection point $x_{RG}$ or $y_{RG}$ and the left-hand lower corner point of a cell 8 and, identical thereto, the grey-shade cell 41. It is necessary to define the cells 8 which are in each case successively intersected, and the coordinates $x_{RG}$, $y_{RG}$ of their intersection points when passing through a helical line 20 from the initial point to the end point. The calculation of these coordinates will be discussed later with reference to a specific flow diagram.

The intersection coordinates $x_{RG}$, $y_{RG}$ are transferred to the grey-shade cell 41 (FIG. 12) in order likewise to make it possible to define the fine cells 42 intersected there and the coordinates of the points at which they are intersected by the helical line 20. These intersection coordinates of the fine cells 42 have the coordinates $x_a$ and $y_a$ for the initial point at which the helical line 20 enters a fine cell 42, as well as the coordinates $x_e$ and $y_e$ for the end point at which the helical line 20 leaves the fine cell 42 again. The coordinates $x_z$ and $y_z$ of a mid-point of the helical line section which is bounded by a fine cell are required for the further computation sequence. They are obtained as the mean value of the coordinates for the entry point and exit point.

$$x_z = \frac{x_a + x_e}{2} + x_{RG}$$ (MK)

$$y_z = \frac{y_a + y_e}{2} + y_{RG}$$

For these last-mentioned coordinates, the grey-shade value is taken from the current fine cell 42 and is noted for comparison purposes.

Figure 15:
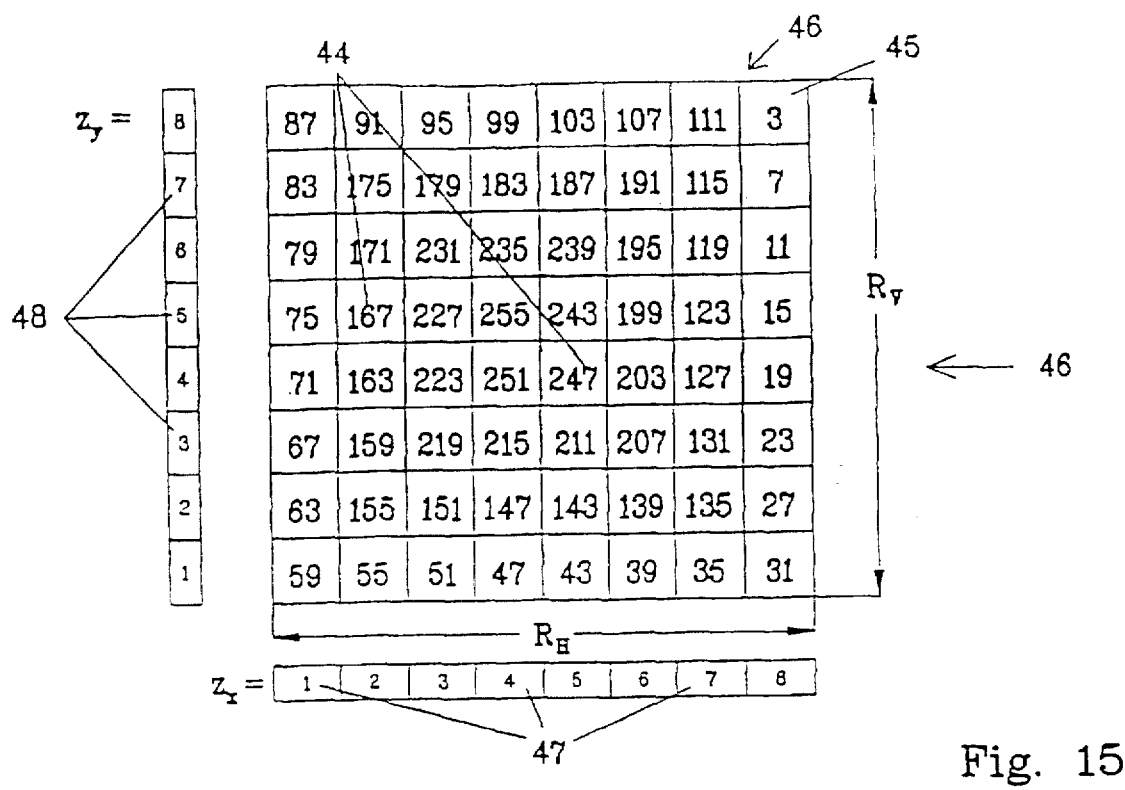
FIG. 15 shows the construction of a reference cell of the grid.

FIG. 15 illustrates the reference cell 46, which is required for this comparison and has already been mentioned a number of times, of the virtual grid 15. In the case of this exemplary embodiment, 8 times 8=64 individual cells 44 are provided within this reference cell 46 and contain grey-shade values from 3 to 255. The grey-shade values start with their lowest value in an outer corner cell 45 of the reference cell 46 and run in a spiral shape into the center of the reference cell 46. In the case of this exemplary embodiment, they at the same time rise monotonally from individual cell 44 to individual cell 44 by a value of 4 in each case here.

In the general case, the reference cell 46 of the virtual grid 15 contains Ngrr times Ngrr individual cells, for example the reference cell 46 may also comprise 80 times 80=6400 individual cells. However, it is expedient to assign to the grey shades values which do not require more than one byte of memory space, i.e., values between 0 and 255. In the case of 6400 individual cells, a plurality of (about 25) successive cells must then always contain the same value and, in addition, the rise from cell to cell is only a value of 1 in each case when a change occurs.

When passing through the reference cell 46, the helical line 20 meets a number of individual cells 44 in the interior of the reference cell 46. However, all the individual cells 44 are not necessarily read out in terms of their values. Instead, only those values which are required at the coordinates $x_z$ and $y_z$ of the current fine cell 42 are always read. The reference cell 46 in the virtual grid can also be regarded as a table in which the values depend on two positions on this, the horizontal position number 47 ($=z_x$) and the vertical position number 48 ($=z_y$). The rotation and the affine distortion of the grid must be taken into account in the assignment of the coordinates ($x_z$ and $y_z$).

If the grey-shade value which is contained in the fine cell 42 is greater than that of the individual cell 44, then the laser is given the command to switch on the beam. The laser beam remains switched on until the grey-shade value in a fine cell 42 is less than the corresponding value in an individual cell 44. When this is the case, the laser beam is switched off.

Figure 16:
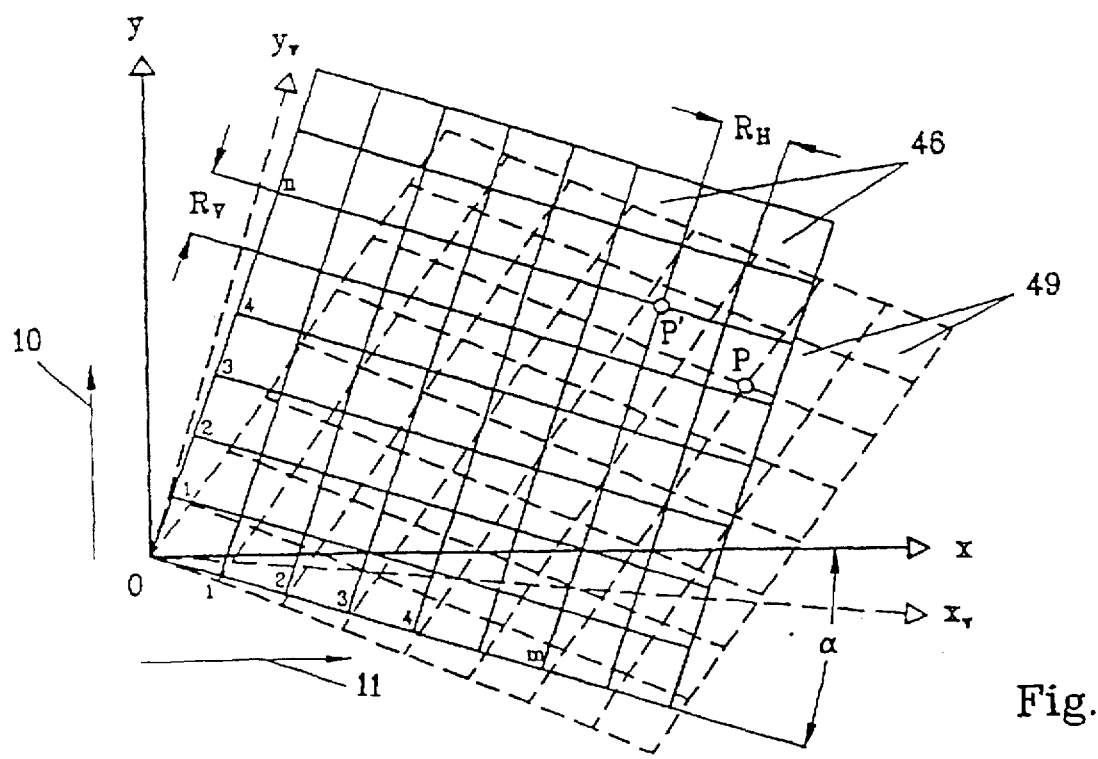
FIG. 16 shows the relationship between a reference cell of the grid and a distorted reference cell which is produced after distortion of the grid.

The assignment of the coordinates $x_z$ and $y_z$ to the position numbers $z_x$ and $z_y$ is shown in FIG. 16. A large number of undistorted reference cells 46 are illustrated here in a coordinate system whose y-axis points in the circumferential direction of a screen cylinder, and whose x-axis points in the axial direction of the screen cylinder. However, this undistorted representation does not correspond to the actual shape of the network elements of the grid on the surface of the screen cylinder, but the shape of the network elements which correspond to these reference cells 46 is affinely distorted. This is illustrated by the distorted reference cells 49. Only in this distorted form are the upper and lower edges of the grid adjacent in the circumferential direction without errors and adjacent to the next longitudinal repeat in the longitudinal direction. A point P' within the undistorted reference cells 46 is moved to a position P after its transformation into the distorted reference cells 49, which position P can be calculated by the relationships (TG) derived earlier. If the undistorted reference cells 46 have the dimensions $R_H$ and $R_V$, then the coordinates of the point P' are given by:

$$x_p = n \cdot R_v \cdot \sin(\alpha) + m \cdot R_H \cdot \cos(\alpha)$$

$$y_p = n \cdot R_v \cdot \cos(\alpha) - m \cdot R_H \cdot \sin(\alpha) \quad \text{(PU)}$$

Using the equations (TG) the following expressions follow for the coordinates of the distorted point P on the actual screen cylinder surface:

$$x_{pv} = n \cdot R_v \cdot K_{xv} + m \cdot R_H \cdot K_{xh}$$

$$y_{pv} = n \cdot R_v \cdot K_{yv} + m \cdot R_H \cdot K_{yh} \quad \text{(PV)}$$

Where the following expressions apply to the total transformation coefficients:

$$K_{xv} = \sin(\alpha) \cdot a_x + \cos(\alpha) \cdot a_y$$

$$K_{xh} = \cos(\alpha) \cdot a_x - \sin(\alpha) \cdot a_y$$

$$K_{yv} = \sin(\alpha) \cdot b_x + \cos(\alpha) \cdot b_y$$

$$K_{yh} = \cos(\alpha) \cdot b_x - \sin(\alpha) \cdot b_y \quad \text{(Ko1)}$$

In the equations (PV), n and m need not be integer values. Instead n and m are integers only when the point having the coordinates x and y is located at a network line intersection point. In the case of arbitrary coordinates, for example in the case of the coordinates $x_z$ and $y_z$ within a reference cell formed from four network lines, for example, n and m correspond to decimal fractions, the digits after the decimal point indicating the location within a reference cell more exactly. If (PV) is solved for n and m, then the following expressions are obtained:

$$n = \frac{x \cdot K_{yh} - y \cdot K_{xh}}{R_v \cdot (K_{xv} \cdot K_{yh} - K_{yv} \cdot K_{xh})} \quad \text{(LO1)}$$

$$m = \frac{-x \cdot K_{yv} + y \cdot K_{xv}}{R_H \cdot (K_{xv} \cdot K_{yh} - K_{yv} \cdot K_{xh})}$$

Figure 17:
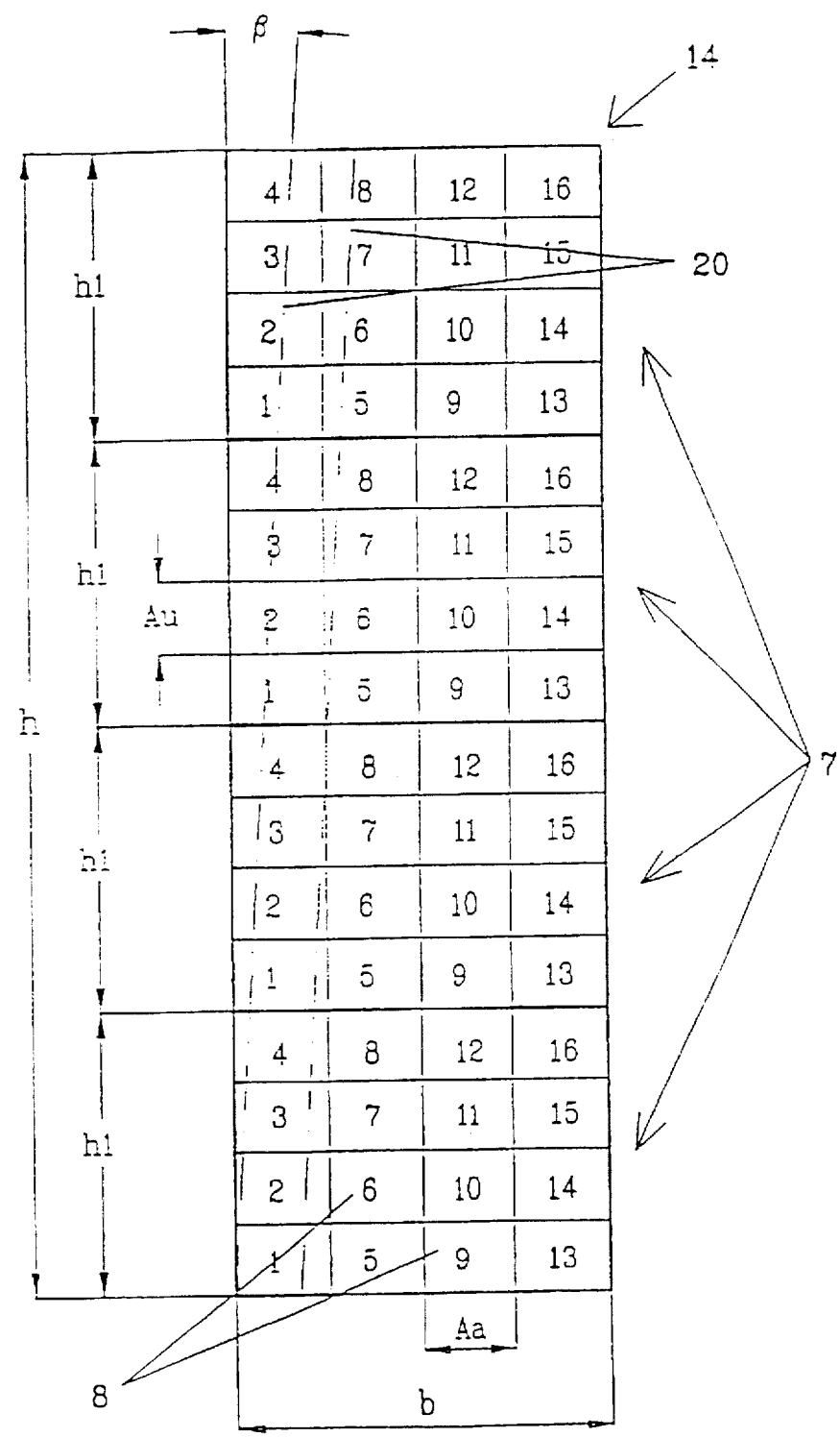
FIG. 17 shows the formation of an additive image by multiple addition of the grey-scale table.

For some of the program sections illustrated in flow diagrams, in particular for the subroutine GTAB, it is necessary to consider the geometric relationships in the production of an additive image 14 in more detail. In FIG. 17, the additive image 14 is formed symbolically by multiple addition of the grey-scale table 7. The grey-scale table 7 in this example contains Nu=4 cells 8 in the circumferential direction, and the same number in the longitudinal direction. The additive image is formed by Numf=4 additions in the circumferential direction of the grey-scale table 7 which is always the same. The parameters As, Au, Sa, Su are entered in the illustration and in this way indicate the dimensions to which they correspond.

FIGS. 18 to 21 show a number of important special cases of the intersection conditions of the cells 8 and 41 by the helical line 20, these special cases being important for understanding of the computation routines which will be described later. These last illustrations are essentially taken from FIG. 17.

FIG. 18 illustrates a cell 8 which is located at the point where the stencil gravure starts. This is, of course, also the first cell in the grey-scale table 7 and thus has the serial number 1. Although the dimensions Sa and Su have likewise been entered here, both parameters are, however, assigned the value 0 in this special case. Here, the helical line 20 runs precisely through the left-hand lower corner point of the cell 8. In this case, $x_{RG}=0$ and, likewise, $y_{RG}=0$.

FIG. 19 shows a cell 8 of the grey-scale table 7 in which the entry point 51 of the helical line 20 is displaced by the value $x_{RG}$. If the helical line 20 passes through the level Au of the cell 8, then the exit point 52 of the helical line is located further to the right by the amount dGa, and the exit coordinate $x_{RGN}$ is greater than the entry coordinate $x_{RG}$ by precisely this amount. This is the most common and general case of a helical line passing through a cell 8. The magnitude of $y_{RG}$ is in this case equal to zero, and the corresponding dimension is therefore not shown in this figure.

FIG. 20 shows the special case in which the helical line 20 leaves the cell 8 having the serial number 2 by intersecting the right-hand side edge 54, which is drawn vertically, and thus entering the adjacent cell 8, having the serial number 6, on the left-hand side edge 54 of the adjacent cell 8. In this case, $y_{RG}$ is not zero, but $x_{RG}$ is equal to zero here, of course.

Finally, FIG. 21 illustrates the last special case, in which the helical line 20 leaves a cell 8 precisely at the upper right-hand corner point 53, which is coincident with the left-hand lower corner point of that cell 8 which the helical line 20 enters.

The steps which are to be adhered to for grid application can now be described, using these results, by the flow diagrams in FIGS. 22 to 25.

A tabular overview of the parameters used should be given before describing the routines in the flow diagrams in detail:

| Parameter | Meaning: |
|---|---|
| | Main routine: |
| b | Width of the additive image |
| h | Height of the additive image |
| h1 | Height of the grey-scale table |
| v | Offset distance in the circumferential direction |
| Au | Dimension of a grey-shade cell 8 from the grey-scale table 7 in the circumferential direction |
| Aa | Dimension of a grey-shade cell 8 from the grey-scale table 7 in the axial direction |
| $\bar{\alpha}$ | Angle of a helical line which is transformed in the affine distorted grid |
| α | Desired rotation position of the grid with respect to the axial and circumferential directions |
| β | Angle of the helical line with respect to the circumferential direction |
| Nlngs | Number of longitudinal additions of the additive image for an entire stencil; corresponds to the number of calls to the routine GTAB (...) |
| Nu | Number of memory cells 8 of the grey-scale table 7 in the direction of the circumference of the stencil |
| Numf | Number of additions of the grey-shade cell 8 from the grey-scale table in the circumferential direction |
| N1 | Number of fine cells 42 per grey-shade cell 8 from the grey-scale table in the circumferential direction |
| N2 | Number of fine cells 42 per grey-shade 8 from the grey-scale table in the axial direction |
| tu | Dimension of the fine cell in the circumferential direction |
| ta | Dimension of the fine cell in the axial direction |
| $a_x, a_y, b_x, b_y$ | Transformation coefficients |
| $K_{xv}, K_{xh}, K_{yv}, K_{yh}$ | Total transformation coefficients |
| D1, D2 | Denominators of the conditional equations (LO1) for n, m |
| | Routine GTAB: |
| ZNr | Cell number of a memory cell in the grey-scale table. |
| Su | Circumferential coordinate, measured from the start point of the stencil to the left-hand lower corner point of the cell 8 currently being processed (= coarse coordinate) |
| Sa | Axial coordinate, measured from the start point of the stencil to the left-hand lower corner point of the cell 8 currently being processed (= coarse coordinate). |
| $x_{RG}, y_{RG}$ | Coordinates of the entry point of a helical line into cell 8 measured from its left-hand lower corner point. |
| $x_{RGN}$ | Coordinate of the exit point of a helical line in cell 8, measured from its left-hand lower corner point. |
| Liflg | Flag which indicates that a left-hand side edge of a cell is intersected by the helical line. |
| | Routine RGTZ: |
| $x_a, y_a$ | Coordinates of the entry point of the helical line into a fine cell with respect to its left-hand lower corner point (= initial point). |
| $x_e, y_e$ | Coordinates of the exit point of the helical line from a fine cell with respect to its left-hand lower corner point (= end point). |

-continued

| Parameter | Meaning: |
|---|---|
| $x_h, y_h$ | Auxiliary coordinate which describe the distances between the left-hand lower corner point of the current fine cell and the left-hand lower corner point of the grey-shade cell 41. |
| $x_z, y_z$ | Coordinates of the mid-point of a helical line section, which is enclosed by a fine cell, with respect to the left-hand lower corner point of the grey-shade cell 41. |
| Gtw | Grey-shade value = value of the grey shade in a cell in the grey-scale table |
| | Routine GRTV: |
| x, y | Coordinates of the mid-point of a helical line section, which is enclosed by a fine cell, with respect to the start point of the stencil. |
| n, m | Transformed coordinates. |
| Δn, Δm | Decimal fraction of the transformed coordinates = coordinates of an individual cell 44 of the reference cell in the virtual grid with respect to the left-hand lower corner point of the reference cell in the virtual grid. |
| $z_x, z_y$ | Horizontal and vertical position number, respectively of an individual cell 44 of the reference cell in the virtual grid. |

Figure 22:
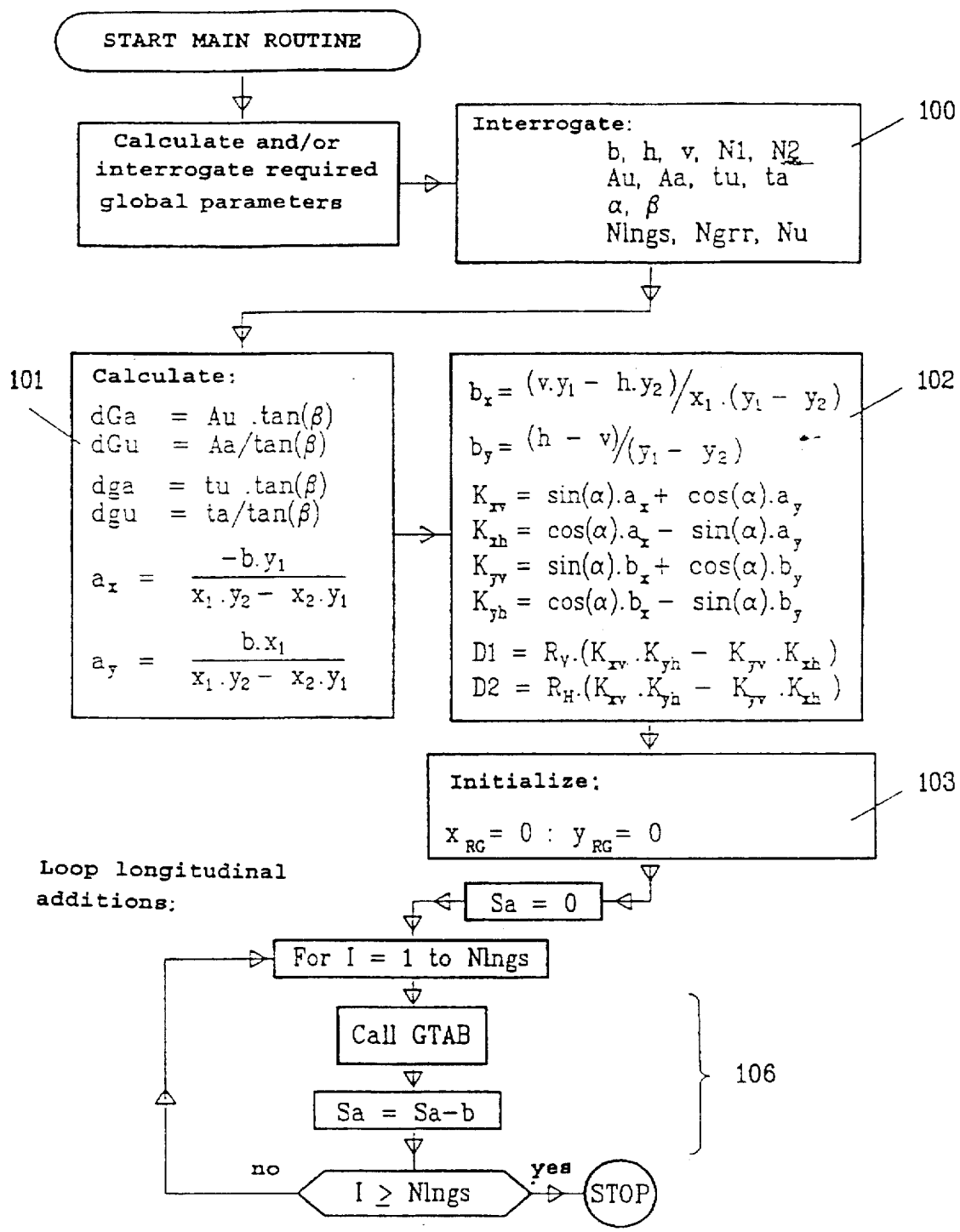
FIGS. 22 to 25 show flow charts to explain the sequence of the method according to the invention.

FIG. 22 shows the main computation routine to be followed. At the start, all those parameters are interrogated (step 100) or calculated (step 101, 102) which remain valid throughout the entire process of grid application of a screen cylinder. It should be noted in particular that Au is actually included as an integer in the height h of the additive image 14 (=circumference h of the screen cylinder). Thus, this value may not be corrupted by numerical rounding such that Nu*Au differs from h. This condition can be satisfied by appropriate selection of the computation accuracy (double precision) and judicious selection of the value of Nu. All the parameters used should be used as so-called global parameters, that is to say that any parameter value can be accessed from any program section. The coordinate values $x_{RG}, y_{RG}$ are set to zero in section 103, this being necessary for the left-hand lower cell of the grey-scale table 7 or of the additive image 14 which is processed first by the program and represents only the grey-scale table 7 being joined together sequentially a number of times. The subroutine GTAB is called up Nlngs times within a loop 106. Before this, the value Sa is set to zero in this loop 106 for each new run, because each run corresponds to the complete production of an additive image 14.

Figure 23:
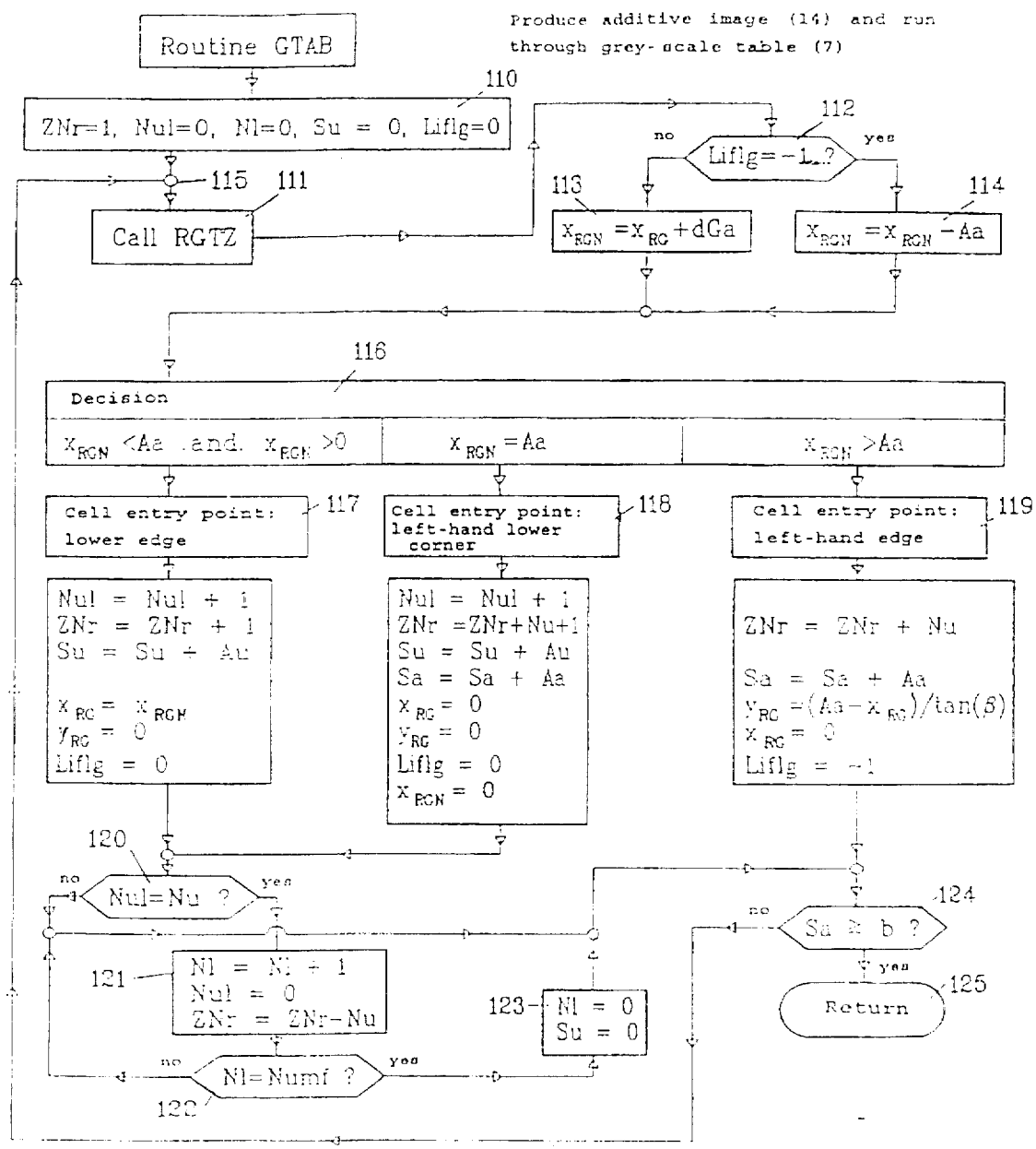

FIG. 23 shows the subroutine GTAB in which the additive image is produced. Reference is made to FIGS. 17 to 21 for the explanation of the mathematical-geometric relationships. At least one complete run through the grey-scale table 7 takes place in this routine. However, in general, there are Numf runs through the grey-scale table 7 to produce an additive image. This is identical to the gravure of a complete longitudinal repeat. This is followed by a jump back to the calling program section. The head of the loop which is to be run through a plurality of times is located at step 115.

First of all, the start conditions which are required for starting are produced at step 110. The cell number of the grey-scale table 7 is first of all set to the value 1 because, as has already been mentioned, the gravure work starts at the left-hand lower corner of the first cell 8 in the grey-scale table 7. The counting parameters Nu1 and L1 are set to zero, and the flag Liflg is deleted, that is to say set to zero. The routine RGTZ is called immediately after this, at step 111, within which routine the reference grey-shade cell and its fine cells are dealt with. This program section will be described later.

The flag Liflg is interrogated at step 112. If this flag is set, then the program jumps to step 114, otherwise to step 113. The flat Liflg basically indicates whether the left-hand edge of a cell has been intersected during the last run through the present program loop. If this was the case, then the value $x_{RG}$ was set to 0 in the branch 119 during the last run through the program, and the entry into a cell via its left-hand side edge has been dealt with. In the second section, a cell is now entered via its lower edge and this section must now be processed. However, $x_{RGN}$ is now too large by the amount Aa and must be appropriately reduced at step 114.

If the flag Liflg is not set, then a new $x_{RGN}$ coordinate is formed simply by adding the variable dGa (see, for example, FIG. 14) to the old $x_{RG}$ coordinate. The program now runs into the decision step 116, which assesses the magnitude of the value $x_{RGN}$. Depending on whether $x_{RGN}$ is between Aa and 0 or is equal to Aa or greater than Aa, the program jumps to branch 117, branch 118 or branch 119, respectively.

In accordance with the terminology which has been imposed together with FIGS. 17 to 21, the program proceeds (branches after) branch 117 when the helical line passes through the upper edge of the current cell 8 from the grey-scale table 7, while exiting from it. This is the case when the variable $X_{RGN}$ is between 0 and Aa. The helical line now has to pass through a cell 8, without having any vertically running side edge 54 to cut through, and has entered the next cell above it. In so doing, an upper or a lower edge between two cells is cut through. In this case, Nu1, which is a parameter describing the sequential numerical value of a cell only in the circumferential direction, is incremented by 1, as is the sequential cell number ZNr in the grey-scale table 7. The coordinate of the cell corner point in the circumferential direction Su is increased by the height of a cell Au. The x-coordinate $x_{RG}$ of the entry point of the helical line into the next cell is set to the value $x_{RGN}$, which was the x-coordinate of the exit point 52 of the helical line 20 from the preceding cell 8. The coordinates of this last mentioned cell were determined in the previous run through the loop. The value of the y-coordinate $y_{RG}$ of the entry point is in this case always equal to 0.

The program proceeds to branch 118 if the helical line leaves a cell precisely at its right-hand upper corner point and thus enters the next cell at the left-hand lower corner point. In this case, $x_{RGN}$=Aa. The value Nu1 is incremented by 1, but the cell number is incremented by 1+Nu. In addition, the coordinates Sa in the axial direction and Su in the circumferential direction, both of which rise suddenly, are incremented by the width Aa and the height Au, respectively, of a cell. In this case, $x_{RG}$ and $y_{RG}$ both assume the value 0. Finally, $x_{RGN}$ must be set to zero in order that, in the next addition of dGa in step 113, $x_{RGN}$ does not become greater than Aa and the program does not proceed to branch 119 incorrectly in the next run.

The program proceeds to the branch 119 if $x_{RGN}$ has become greater than Aa. From step 113, it can be seen that this condition occurs when a dGa which is so large that $x_{RGN}$ subsequent exceeds the value Aa is added to a value of $x_{RG}$ which is a little less than Aa. In this case, the helical line passes through two adjacent cells on their vertical side edges even before $x_{RGN}$ can assume the described value. The cell number ZNr must be increased precisely by Nu. Actually, the helical line section which is cut out of the helical line by a lower and an upper cell edge is broken by the vertical side edge which in this case passes through it into two sections, and the computation routine must also take account of this situation. Initially, the variables $x_{RG}$ and $y_{RG}$ are set for the exit of the helical line 20 from the first section. The cell number ZNr must be incremented by Nu, and the variable Sa by Aa. $y_{RG}$ is computed in accordance with the geometric characteristics, and $x_{RG}$ is, of course, equal to 0. Liflg is set to −1 in order that it is still known for the following run through the loop that a second section will be following in which the helical line once again cuts through a lower and upper cell edge.

The exit from the branches 117 and 118 is followed by the interrogation 120 which asks whether the number of cells which have already been processed corresponds to the height of the grey-scale table 7 (Nu1=Nu). If this is the case, the counting parameter N1 is incremented by 1 in step 121, because a further grey-scale table is added to the additive image. The counting parameter Nu1 is once again set to 0 and the cell number must be decremented by Nu. At step 122, a question is asked as to whether the number of additions in the grey-scale table 7 corresponds to the required number Numf for a complete additive image 14. If this is the case, then the value N1 and the value of the condition Su are set to zero at step 123. Since the value of Sa may be greater than or equal to b if the program has passed through the branches 118 and 119, this condition is tested at interrogation 124. If the last condition is also satisfied, then there is no need to consider a further cell 8, the additive image is complete and the program jumps back at step 125, to the program point which called the routine GTAB.

Figure 24:
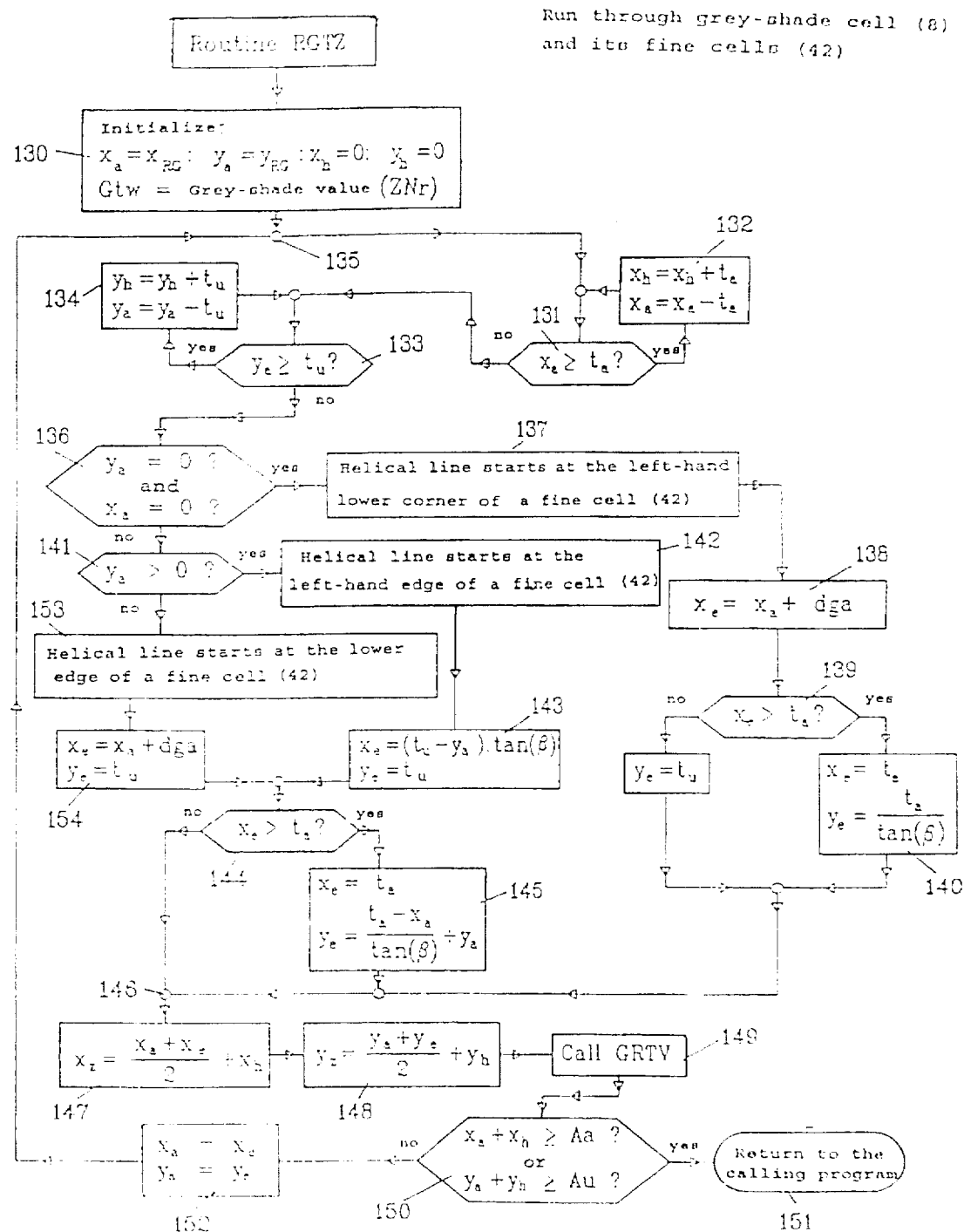

FIG. 24 shows the subroutine RGTZ, in which a cell 8 is once again divided more finely and a grey-shade cell 41 is advantageously formed in this manner, as illustrated in FIG. 12. In order to describe the program routines, reference is made in particular to the relationships illustrated in FIG. 12. A cell is divided N1-times in the circumferential direction and N2-times in the axial direction. In order to divide a cell 8, the grey-shade value Gtw is in each case taken from the grey-scale table 7 and assigned to the fine cells 42 of the reference grey-shade cell. In the course of this routine, a decision is also made as to which of the fine cells 42 of the reference grey-shade cell is intersected by the helical line 20. This division of a cell 8 not only creates the option in principle for interpolation of the grey-shade values within the fine cells 42 of the grey-shade cell 41. An additional advantage is increased computation accuracy, which appears important particularly with respect to avoiding a visible interface at the point where the additive image joins the circumference of the screen cylinder.

A computation example should explain this. A numerically produced sum error results from the addition of the error of Au Nu-times to the sum Su (=circumferential coordinate) increased by N1-times the error of tu, although the actual division of the circumference h of the screen stencil is equal to the product of Nu and N1 and the fine division length=tu.

Examples of the invention with fine cell division

| | | |
|---|---|---|
| Circumference of the screen cylinder | h | = 1250 mm |
| Dimension of the grey-shade cell | Au | = 0.1 mm |
| Dimension of the fine cell | tu | = 0.0333 mm |
| Computation accuracy | | = 1E − 4 (integer accuracy); |

-continued

| Possible error per addition | = 0.1*1E − 4 mm = 1E − 5 mm |
| --- | --- |
| Number of additions per circumference | Nu = h/AU = 12500 |
| Possible sum error after one circumference | = (12500 + 3)*1E − 5 mm = = 125 µm |

Without fine cell division

| Circumference of the screen cylinder | h | = 1250 mm |
| --- | --- | --- |
| Dimension of the grey-shade cell | Au | = 0.0333 mm |
| Computation accuracy | | = 1E − 4 (integer accuracy); |
| Possible error per addition | | = 0.1*1E − 4 = 1E − 5 mm |
| Number of additions per circumference | Nu = h/AU | = 37500 |
| Possible sum error after one circumference | | = 37500*1E − 5 mm = 0.375 mm = 375 µm. |

The errors determined here are, of course, much too large for gravure work. By choosing a higher computation accuracy (single precision<1E-7 or double precision<1E-15), the required accuracies (<=1 µm) can be achieved, but the computation time penalty is consequently increased.

The conditions required for starting are set at step 130. The coordinates of the entry point of a helical line 20 into a fine cell 42 are in this case designated $x_a$ and $y_a$, and those of the exit point $x_e$ and $y_e$. On entering the routine, the coordinates of the entry point enter a fine cell 42—the entry point is designated here by the starting point, and the exit point by the end point—are set to the values $x_{RG}$ and $y_{RG}$. In a very similar manner to that earlier, the coordinates $x_a$ and $y_a$ as well as $x_e$ and $y_e$ are measured from the left-hand lower corner point, but now from a fine cell 42. Furthermore, auxiliary coordinates $x_h$ and $y_h$ are both set to zero. These auxiliary coordinates have a meaning which is similar to that of the parameters Sa and Su. They represent the distances between the left-hand lower corner of the current fine cell 42 and the left-hand lower corner point of the current cell 8.

The question is now asked at interrogation 131 as to whether $x_a$ is greater than the pitch $t_a$ of a fine cell in the axial direction. If this is the case, then the auxiliary coordinate $x_h$ is in each case incremented by $t_a$ at step 132, and $x_a$ is decremented by the same amount, to be precise until the interrogation 131 is exited via the NO output, i.e., when $x_a$ has become $<t_a$. An identical operation is carried out on $y_a$ and $y_h$, but the incrementation and decrementation of the parameter $t_u$ is used in step 134 for the comparison in this case at the interrogation 133.

A question is now asked at interrogation 136 as to whether $x_a$ and $y_a$ are both equal to zero. If this is the case, the helical line 20 can now start only at the left-hand corner point of the fine cell 42 which is just under consideration. The program branches to step 137. The value of the x-coordinate $x_e$ of the exit point of the helical line 20 from the fine cell 42 is initially determined at step 138 by adding the value dga to $x_a$. In the case of fine cells which have, so to speak, deteriorated, it is possible for $x_e$ to exceed the value $t_a$, although this is highly improbable. A check for this situation is therefore carried out at interrogation 139. If the interrogation 139 is exited via the YES output, then, as one can easily see geometrically, $x_e$ must assume the value $t_a$ and $y_e$ must be equal to $t_a/\tan(\beta)$. If the interrogation 139 is exited via the NO output, then $y_e$ assumes the value of $t_u$ and $x_e$ does not need to be corrected.

The further computation steps are once again carried out in an identical manner to those which must be carried out after leaving the interrogation 136 via the NO output after the adequate program point. However, it is intended to deal with this later.

The interrogation 136 is considered once again and it is assumed that this is now left via the NO output. The question is asked at interrogation 141 whether this case therefore has occurred because $y_a$ was greater than zero. If this interrogation 141 is left via the YES output, then the helical line 20 enters the fine cell which is currently under consideration via its left-hand edge, and the program proceeds to step 142. The coordinates of the end point $x_e$ and $y_e$ of the helical line section which is cut out by this fine cell 42, i.e., the coordinates of the exit point of the helical line from the fine cell 42, turn out to be, for geometric relationships set forth in step 143:

$$x_e = (t_u - y_a) \cdot \tan(\beta)$$

and $$y_e = t_u.$$

This is followed by the interrogation 144, which ensures that $x_e$ is not greater than $t_a$. If the interrogation 144 is left via the YES output, then $x_e$ and $y_e$ must be corrected in accordance with computation rule in step 145. If the question in the interrogation 144 is answered with NO, the program can be continued without such treatment of $x_e$ and $y_e$.

Before discussing the subsequent steps, which are the steps in common to all the branches originating from the interrogations 136 and 141, it is also necessary to discuss the case of a NO response to the interrogation 141 and the program proceeds to step 153. In this case and the last case, the starting point of the section which is cut out of the helical line 20 by the current fine cell 42 is located at the lower edge of the fine cell 42. First of all, $x_e$ and $y_e$ must be determined in accordance with the computation rule in step 154, checked by the interrogation 144 and, if appropriate, corrected by the computation rule in step 145.

All the different program branches which have recently been discussed meet again at the connector 146. The coordinates $x_z$ and $y_z$ of the mid-point of the section of the helical line 20 cut out by the fine cell 42 are now calculated. These coordinates now once again apply with respect to the left-hand lower corner point of the current cell 8 and not with respect to the fine cell 42. It is evident that these coordinates $x_z$ and $y_z$ follow as mean values from $x_a$ and $x_e$ as well as $y_a$ and $y_e$, to which the values of the auxiliary coordinates $x_h$ and $y_h$ must also be added. The computation rules in steps 147 and 148 correspond to this situation.

The routine GRTV, which will be described later, is called up at 149. The return from GRTV is followed by an interrogation 150 in order to confirm whether the coordinates of the end point $x_e + x_h$ and $y_e + y_h$ have reached or exceeded the height Au of the cell 8, or its width Aa, with respect to the left-hand lower corner point of the cell 8. If one of the two conditions can be answered with yes, then this is an indication that all the fine cells 42 of the current cell 8 which are intersected by the helical line 20 are being investigated, and a return to the calling program is made at step 151. If this is not the case, the coordinates of the new starting point are set to the values of the previous end point, and the program branches with these values to the head 135 of the previously described loop. A new run through the loop is carried out.

Figure 25:
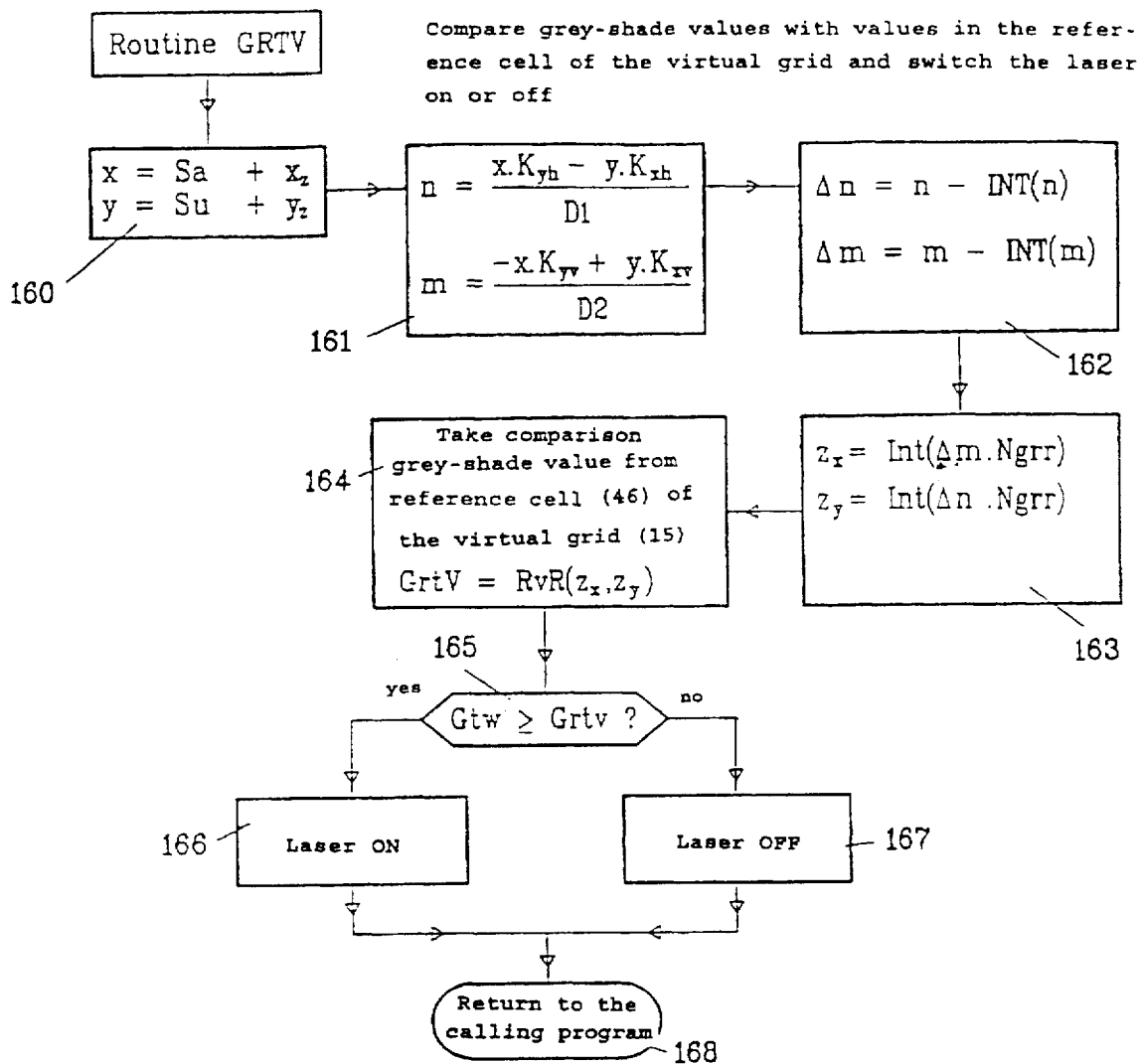

Finally, the subroutine GRTV will be discussed with reference to FIG. 25. This subroutine GRTV uses the relationships (L01) to transform the coordinates ($x_z$, $y_z$) of the mid-point of a section of the helical line 20, which has been cut out by a fine cell 42 within the grey-shade cell 41, into the coordinate system of the reference cell 46 of the virtual grid. The coordinates x, y of the mid-point which has just been mentioned are formed with respect to the starting point of the stencil gravure, at step 160, from ($x_z$, $y_z$) and Sa, Su. These coordinates x, y are mapped into a coordinate system of the reference cell 46 of the virtual grid 15 by the computation rule at step 161 or, in other words, with the aid of the relationships (L01), in which coordinate system, the origin of the coordinate system coincides with the starting point of the stencil gravure.

As has already been described in conjunction with the production of the relationships (L01), the transformed coordinates n, m are not necessarily integers. The values n, m are integers only when x and y are, by chance, the coordinates of a network line intersection point. It follows immediately from this, however, that the decimal fractions $\Delta n$ and $\Delta m$ of these values correspond to the position coordinates within the reference cell of the virtual grid. Thus, according to the computation rule at step 162, these decimal fractions are formed by the integer element (=INT(n)) of n being subtracted from the value of n, and the same procedure being adopted with the value m. In order finally to form the position numbers $z_x$ and $z_y$, the decimal fractions $\Delta n$ and $\Delta m$ now only need to be multiplied by Ngrr, and the integer element, which is now rounded however, is in turn determined from this product. This is done using the computation rule in step 163. Ngrr corresponds to the number of individual cells along one edge of the reference cell of the virtual grid.

In the case of the program implementation which is assumed here for storage of the grey-shade values for the reference cell 46 of the virtual grid 15, these values have been accommodated in a two-dimensional memory area. The position numbers $z_x$ and $z_y$ may be regarded as the indices for this two-dimensional area. The comparison grey-shade value GRTV can then be taken from the memory area, at step 164, using these position numbers or indices. The value Gtw—the grey-shade value of a fine cell within the reference grey-shade cell—has already been determined earlier (FIG. 24, step 130). The comparison between Gtw and GRTV is carried out at step 165, and this represents the decision as to whether the laser is switched ON or OFF in step 166, 167, respectively. Finally, the return to the calling program is made at step 168.

The determination, which has been explained further above, of the relative coordinates via the relationships (L01) avoids the disadvantage which results, for example, from small errors being continuously added and being able to form a large total area at the end of the pattern, that is to say where there is potentially a risk of interfaces being formed. This would lead to a faulty image which would appear like a longitudinal seam.

The command, which has likewise been addressed within this program section, for switching ON or OFF in this case applies to a laser which removes parts of the covering lacquer layer of a screen cylinder, for example by thermal action, in order to form the pattern. A completely identical pattern image can also be produced in an identical lacquer-sealed screen cylinder by using the action of laser radiation to crosslink the lacquer layer, which is a resin or prepolymer layer which has been dried but not yet crosslinked (=polymerized) and, following this, dissolving those points which have not been crosslinked and are thus more easily soluble, in a chemical development process. Since the laser must act on the remaining layer areas in this case and must not illuminate the layer areas to be removed, it is necessary to invert the command for switching ON and OFF a laser which removes the lacquer.

Figure 26:
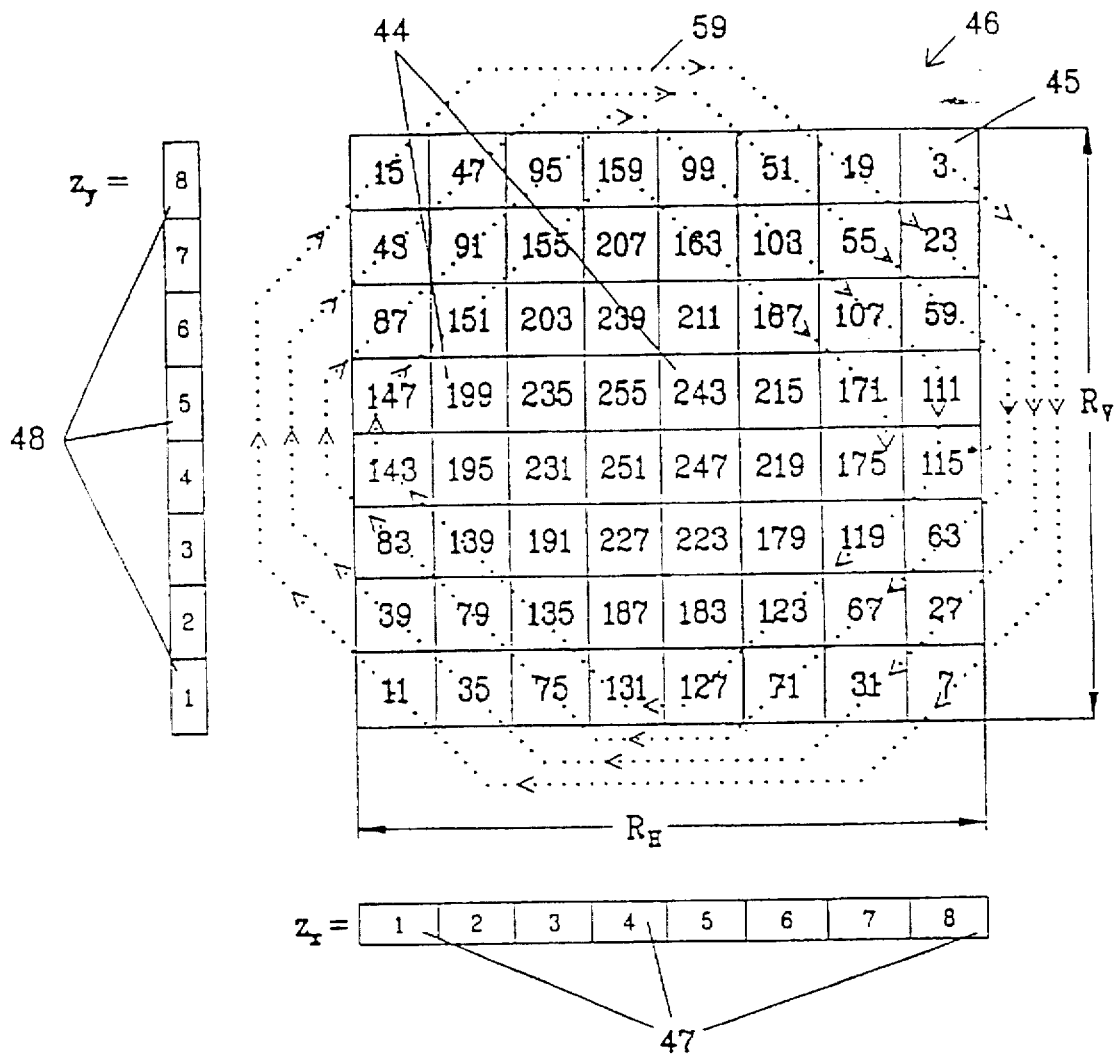
FIG. 26 shows the construction of another reference cell of the grid.

FIG. 26 describes a further reference cell 46 of the virtual grid 15, in the case of which the entry of the grey-shade values into the individual cells 44 has a somewhat different profile from the illustration in FIG. 15. It has already been described in conjunction with FIG. 15 that the grey-shade values form a monotonally rising sequence of numerical values if one follow the individual cells 44 within a reference cell 46 from the edge towards the center. If one follows these numerical values in the direction of increasing values, then a somewhat spiral profile can be seen. While the position of the sub-elements of the spiral are located parallel to the boundaries of the reference cell 46 of the virtual grid in FIG. 15, the profile of the individual cells with rising grey-shade values in FIG. 25 describes a spiral 59, in the case of which the sub-elements of this spiral 59 are located parallel to the diagonal directions of the reference cell 46. This entry of the grey-shade values produces a softer sequence of the grey shades in comparison with a value entry according to FIG. 15.

Figure 27:
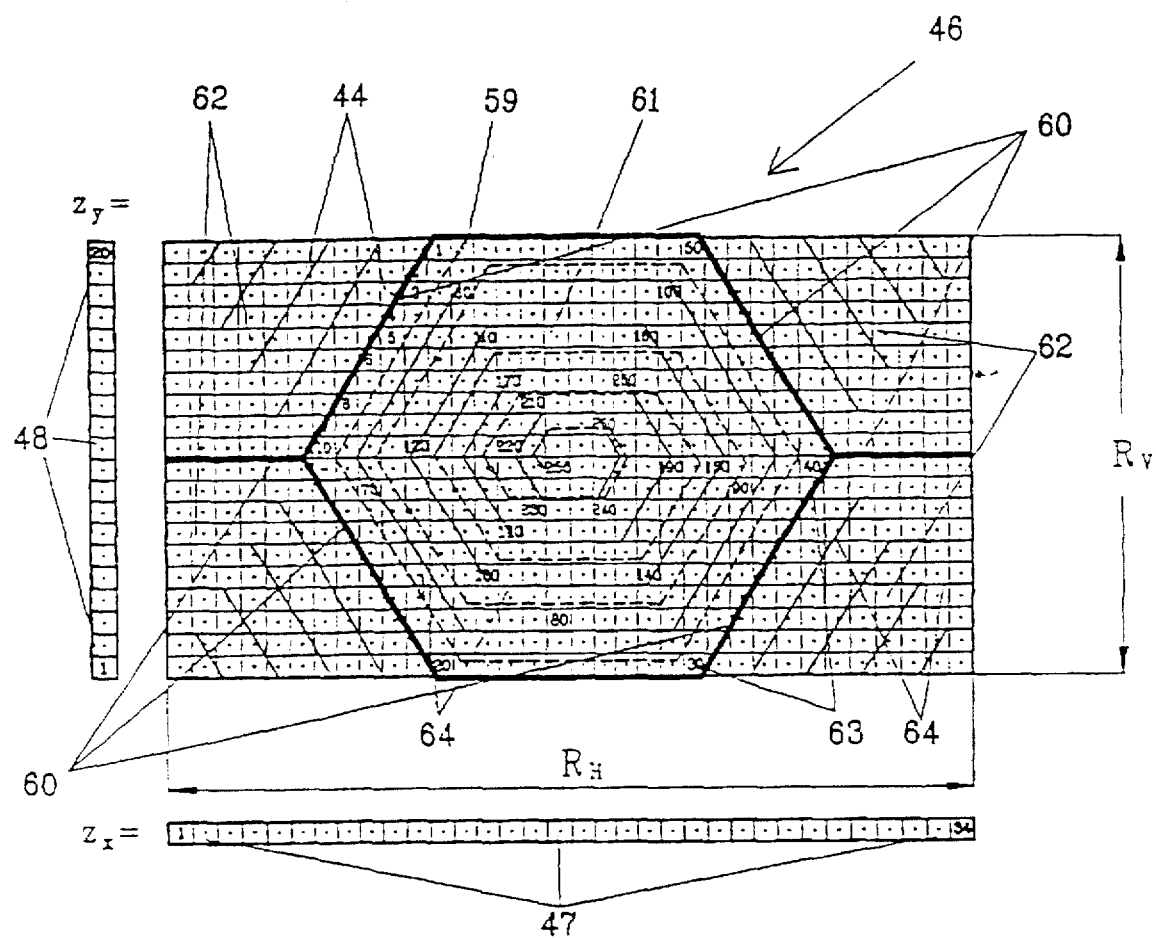
FIG. 27 shows a square reference cell which contains a hexagonal grid cell.

FIG. 27 shows a further possibility for a configuration according to the invention of a reference cell 46 of the virtual grid 15 including the entry of the grey-shade values. The reference cell 46 which is illustrated here has different dimensions $R_H$ and $R_V$ as well as different maximum values for the horizontal position number 47 and the vertical position number 48. The maximum value of the horizontal position numbers 47 is thirty-four, and that for the vertical position numbers 48 is twenty. A hexagonal grid structure 60 is entered in the interior of this reference cell, which is now in the form of a rectangle. Joining a number of these reference cells 46 to one another in the horizontal direction and vertical direction allows a hexagonal grid or a hexagonal honeycomb network to be formed and entered into these individual cells 44, which can be addressed in the same way as those in FIGS. 15 and 26, via the two position numbers 47, 48.

Viewed topologically, the sequence of the individual cells 44 which have rising grey-shade values 63 in this case lie on a spiral 59 which is drawn approximately parallel to the edges of the inner hexagonal cell 61. When a plurality of reference cells 46 are joined together at the corner points of the reference cells 46, the four hexagonal partial cells 62 in each case produce precisely one hexagonal cell 61 which must then also have the same topological structural sequences with rising grey-shade values. The series of lines 64, which are drawn somewhat more boldly, border somewhat channel-like areas of the same width, which surround the spiral 59. Individual cells 44, which have approximately the same grey-shade values, or at least only slightly different grey-shade values, are located approximately at right angles to the direction of the spiral 59, within a channel formed in this way. In the case of this reference cell 46, every second or third grey-shade value appears twice because there are three hundred and forty individual cells 44 in one hexagonal cell 61 and the values from 1 to 255 must be split between them.

Figure 28:
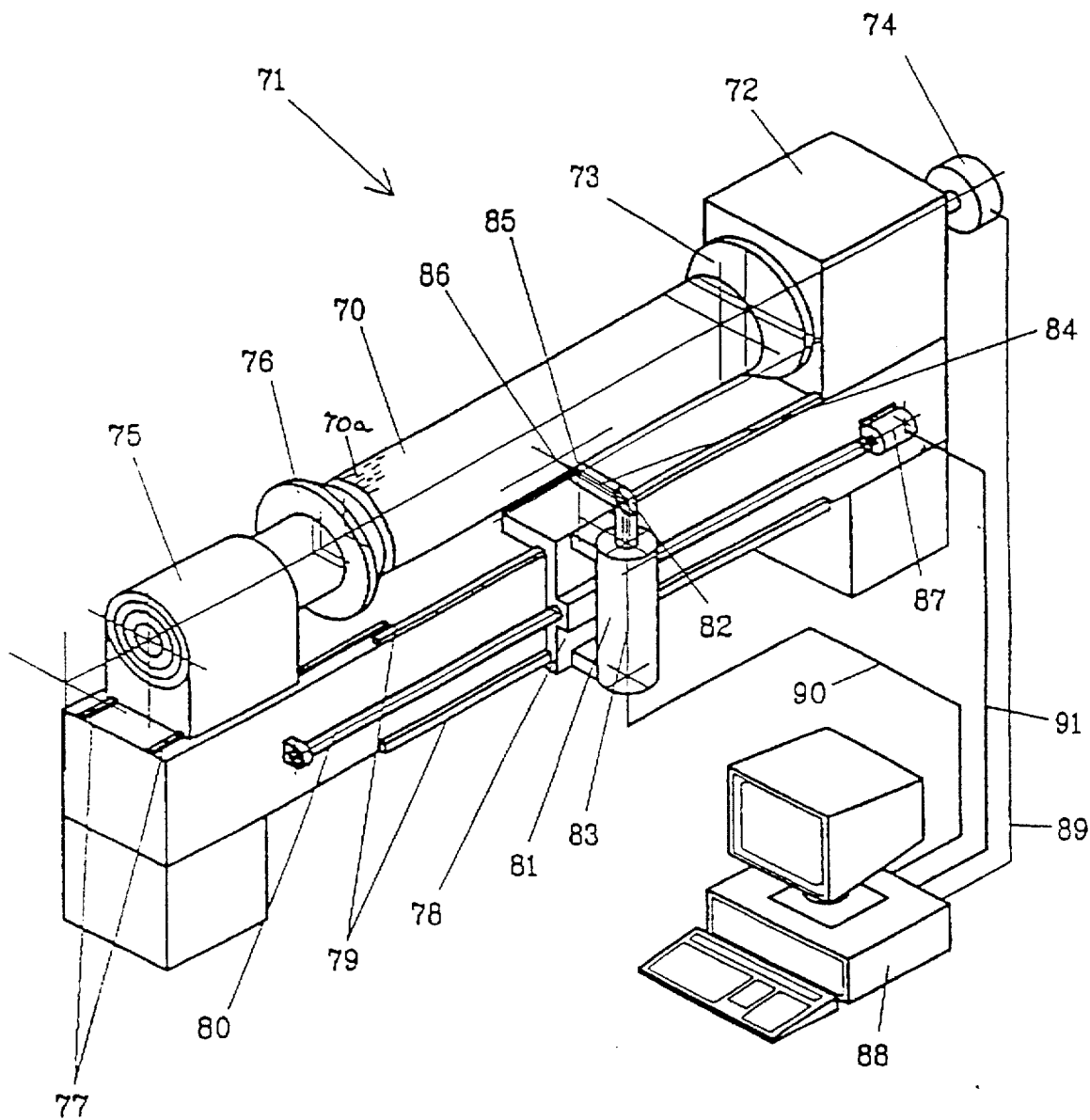
FIG. 28 shows a schematic overall view of a device for carrying out the production of the present invention.

Finally, FIG. 28 illustrates the gravure hardware environment in which the invention is used. A thin-walled hollow cylinder 70 is inserted into a device 71, for rotating the cylinder, for example, a lathe. A shaft, which cannot be seen, is mounted in a headstock box 72, is fitted with a retaining cone 73 at one end and is fitted with a high-resolution pulse transmitter 74 at its other end. Viewed in the longitudinal direction of the hollow cylinder 70, a tailstock 75 is located opposite the headstock box 72 and is fitted with a supporting cone 76, which is likewise mounted such that it can rotate. The hollow cylinder 70 is held or accommodated between the retaining cone 73 and the supporting cone 76 in the same manner as that in which a workpiece is held on a lathe between two centers. The retaining cone 73 is caused to rotate via the shaft, which is mounted in the headstock box 72, and a drive motor which is likewise no longer illustrated, and drives the hollow cylinder 70 as well as the supporting cone 76 just by frictional contact. No further drive devices are required since the only forces acting on the hollow cylinder 70 during the rotary movement are the air drag caused by the rotation and the bearing frictional resistance of the ball bearings, which accommodate the supporting cone 76, in the tailstock 75.

A flexographic printing roller or even a solid gravure roller can be used with this device instead of the hollow cylinder 70. However, in these cases, suitable clamping and supporting elements must then be used instead of the retaining cone 73 and the supporting cone 76.

The tailstock 75 is arranged such that it can be displaced along the guides 77 in the axial direction of the hollow cylinder 70, so that it can be set to different lengths of various hollow cylinders 70. A carriage 78 is arranged on the front of the device 71 in such a manner that it can move in the longitudinal direction of the hollow cylinder 70. The carriage 78 runs on guides 79 and is pulled by a spindle 80.

A laser 81 is firmly mounted on the carriage 78. The optical axis 83 of the laser runs vertically. The laser beam 84 is deflected by a deflection mirror 82 into a horizontal direction, is focused by optics 85 and strikes precisely at the focus point 86 of the optics 85 on the surface of the hollow cylinder 70.

In order to obtain forward movement of the carriage 78, and thus of the focus point 86, which is matched precisely to the rotary movement of the hollow cylinder 70, the spindle 80 is driven by a stepping motor 87. The pattern image, which can be applied on the lacquer-coated or polymer-coated surface of the hollow cylinder 70 by the laser 81 or the laser beam 84 is intended to produce a half-shade effect in the subsequent printing process as a result of the grid being shaped to correspond to the requirements of the pattern to be represented, the ready-engraved hollow cylinder being used as a printing mold for this purpose. The fineness of the grid application and the feed of the carriage 78 and of the focus point 86 must remain selectable for this purpose.

In order to allow all these requirements to be satisfied as flexibly as possible, a control computer 88 is provided which supplies information relating to the respective rotation position of the hollow cylinder 70, via the data line 89, to the device 71. The control computer also determines both the required control signals to the laser 81 and to the stepping motor 87 as a function of the desired pattern for which information is stored on a bulk storage medium, for example the hard disk of the control computer 88. The signals to the laser 81 are supplied along a line 90 and a power amplifier, which is no longer illustrated, and the signals to the stepping motor 87 are supplied along a line 91 and likewise via a power amplifier or a drive stage, which is no longer illustrated. Thus, the control computer 88 effectuates the method described throughout the specification, and shown particularly in the flow charts of FIGS. 22-25.

It is not absolutely essential for the laser 81 to form a unit, which moves together, with the carriage if the laser 81 also has the advantage of a focus spot diameter which remains the same size. The laser 81 can, for example, be installed in a fixed position and then separated from the device 71. In this case, the laser beam is guided by suitable deflection devices such that it is parallel to the axis of the hollow cylinder and of the carriage movement and is directed by a deflection mirror on the carriage 78 onto the surface of the hollow cylinder 70. The lacquer or the light-sensitive coating on the surface of the hollow cylinder 70 can be removed (vaporized, photolithically decomposed) or else cured (polymerized, crosslinked) by the laser 81 at the points predetermined by the pattern image, and can subsequently be washed away at the points which have not been cured. If the beam energy and the characteristics of an optical conductor allow, the laser beam can also be passed via an optical conductor to the focusing optics 85 on the carriage 78.

The invention can be varied in many ways. Instead of reading in the graphical pattern master via a drum or flat-bed scanner, as has been described in conjunction with FIG. 1, the pattern can also be designed directly by an artist on the screen of a computer, for example using a mouse or a digitizer. In the latter case, reading in the pattern can be entirely avoided. A pattern can also be recorded and read in by a video camera. If required, the pattern can be varied in the computer as far as complete loss of any similarity to the master, by the artist, under some circumstances using CAD or morphing programs. Purely mathematical generation of image contents (fractal generator) is also conceivable or the reforming of recorded tonal images into image motifs, and other image contents being superimposed on motifs produced in this way. There is no reading process in any of these cases but, at best, conversion of intensity values for the colors red, green and blue as are required to display the motif on screen into grey-shade values which are suitable for the gravure of stencils.

If a colored pattern master is to be reproduced from a color screen as a colored image on a substrate (textile, paper), then the RGB intensities can alternatively be processed separately. If the pattern is recomposed in later printing, for example from the colors red, green and blue again, then the red intensity is used on its own to determine the size of the opening of a grid point in the stencil. However, the color intensities can be transformed once again (generally linearly), since the intensity limits which can be achieved in printing actually differ from those on the screen. In addition, the shade hue which is produced in printing can be better matched to the visually correct sensitivity of the viewer of the later print by a non-linear transformation of the color intensity level. The same applies to other colors. If the print colors are, for example, cyan, yellow and magenta, then the cyan, yellow and magenta levels must be determined on the basis of the print colors rather than the color components on the screen, by a transformation for example in the following manner:

$$C_D = a_{11} \cdot R_B + a_{12} \cdot G_B + a_{13} \cdot Y_B$$

$$Y_D = a_{21} \cdot R_B + a_{22} \cdot G_B + a_{23} \cdot Y_B$$

$$M_D = a_{31} \cdot R_B + a_{32} \cdot G_B + a_{33} \cdot Y_B$$

The relationships which are quoted in the literature as the Neugebauer equations may be quoted as an example of a non-linear transformation for paper printing.

If grey-shade values have been obtained in this way, then they can also be converted using a method different from that of the comparison with a single reference cell on the virtual grid, as has been explained during the discussion relating to FIG. 15 or 26, into different opening or permeability levels of the stencil. A sequence of different reference cells can be used for this purpose for each grey-shade value.

This method is described with reference to FIGS. 29 to 34. First of all, in FIG. 29, a pattern or a graphical motif is illustrated both with grey-shade fine cells 42 and grid cells 21 superimposed on it. The grey-shade fine cells 42 are bounded by the dashed lines, which run parallel to the image edge. The grid cells 21 are bounded by thin, continuously drawn lines which are an inclination angle of $\beta$ to the screen edges.

Figure 29:
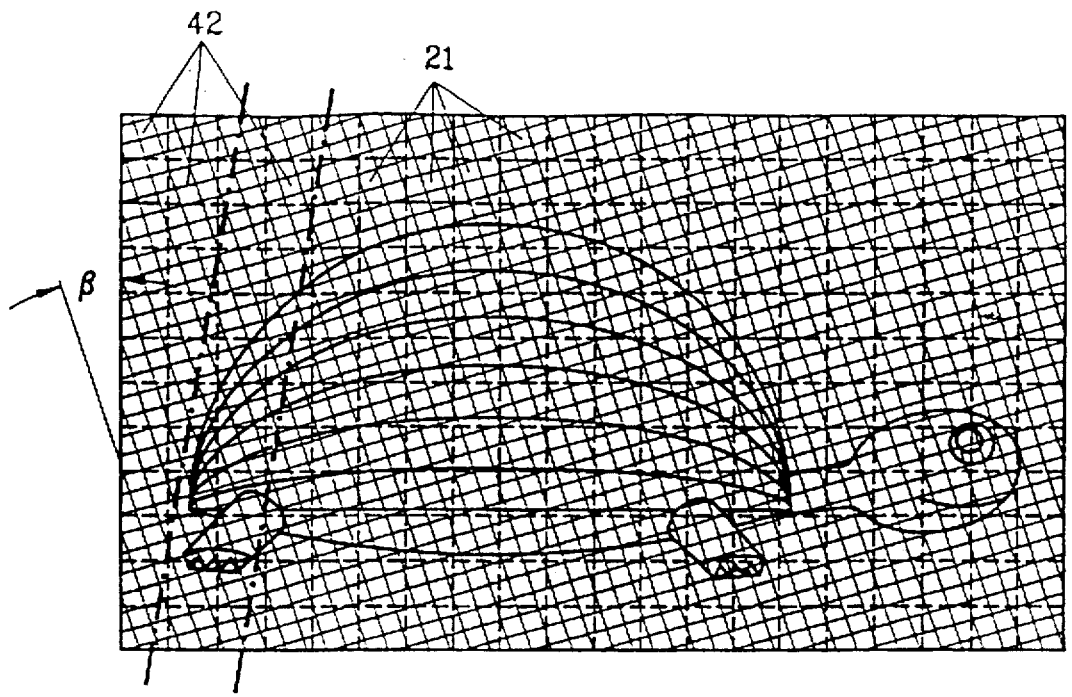
FIG. 29 shows a graphical motif, with fine cells and grid cells superimposed on it.
Figure 30:
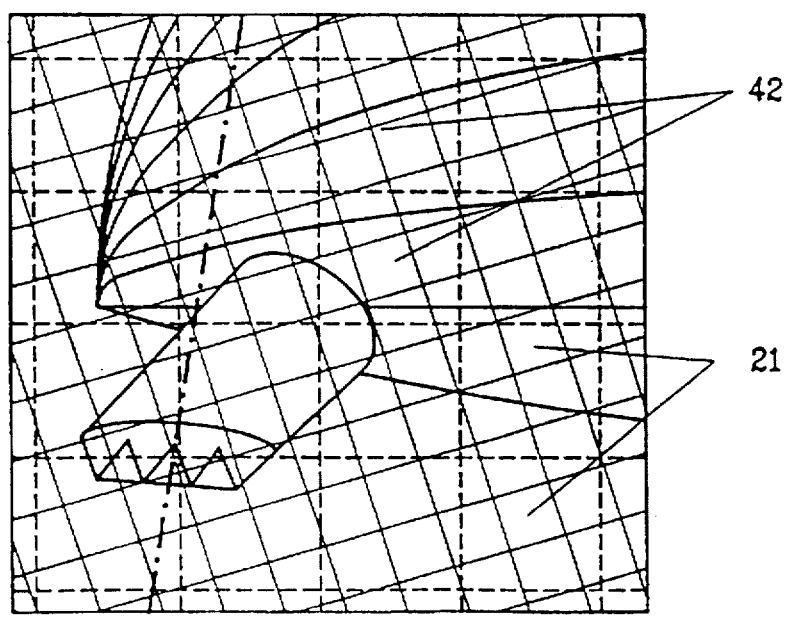
FIG. 30 shows an enlarged detail from the graphical motif according to FIG. 29.

FIG. 30 shows an enlarged portion of the same illustration as in FIG. 29. As has already been explained in conjunction with FIG. 13, the fine cells 42 contain grey-shade values which have been determined, for example, by interpolation of adjacent grey-shade cells. The grid cells 21 are in general smaller than the fine cells 42, so that one fine cell 42 contains a plurality of grid cells 21.

Figure 31:
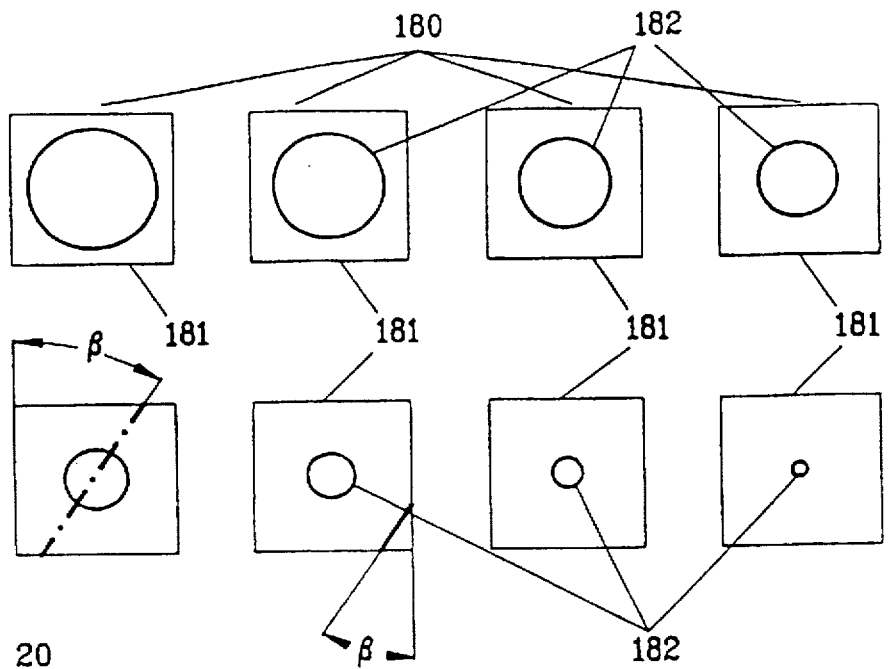
FIG. 31 shows a sequence of reference cells numbered in rising or falling sequence.
Figure 32:
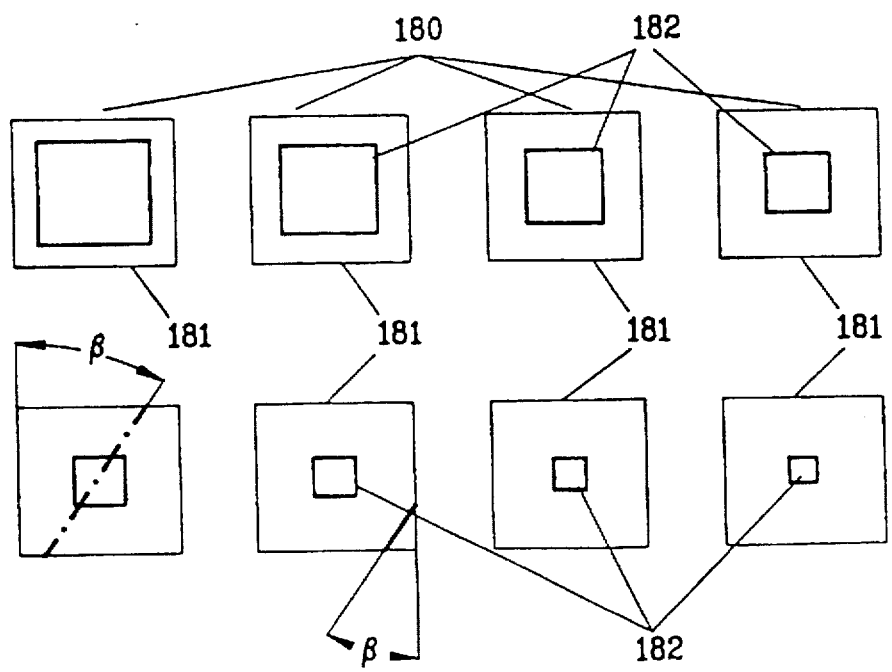
FIG. 32 shows a further sequence of reference cells numbered in rising or falling sequence.

The grey-shade values are now in each case compared with a sequence of reference cells, or their reference grey-shade values, numbered in a rising or falling sequence, for example according to FIG. 31 or FIG. 32. If the number of reference cells is not selected to be the same as the number of grey-shade values, then this comparison is carried out, for example, such that the respective grey-shade value is multiplied by the ratio (number of comparison cells)/(maximum possible grey-shade value), and this value is subsequently rounded off to an integer in accordance with the normal rules. The integer obtained in this way corresponds to the number of the reference cell to be selected in the sequence.

For example, FIG. 31 illustrates a sequence which comprises eight different reference cells 180. The reference cells 180 all have an outer border 181 of the same size but inner circular borders 182 of different sizes which, in principle, indicate the subsequent opening in the stencil at the respective pattern point. It is also possible for the shape of the inner border 182 to change within a sequence of reference cells, that is to say, for example to change from a circle into a square. The number of reference cells in a reference cell sequence can also be selected to be much greater than eight. It is most expedient to select this number to correspond to the number of grey-shade values allowed in the fine cells 42. As has already been shown for the fine cells 42, the grid cells 21 are likewise intersected or cut through by the helical line 20. This has been illustrated for the fine cells 42 in FIG. 12 and the computation program in FIG. 23 has likewise been presupposed, which determined the coordinates $x_{RG}$ and $y_{RG}$ of the entry point of the helical line 20 into a fine cell 42. The entry coordinates of the helical line 20 into a grid cell 21 can be calculated in an adequate manner but the inclination angle $\beta$ of the helical line 20 with respect to the border 181 of the reference cells 180 is different here from that in the case of the fine cells.

Figure 33:
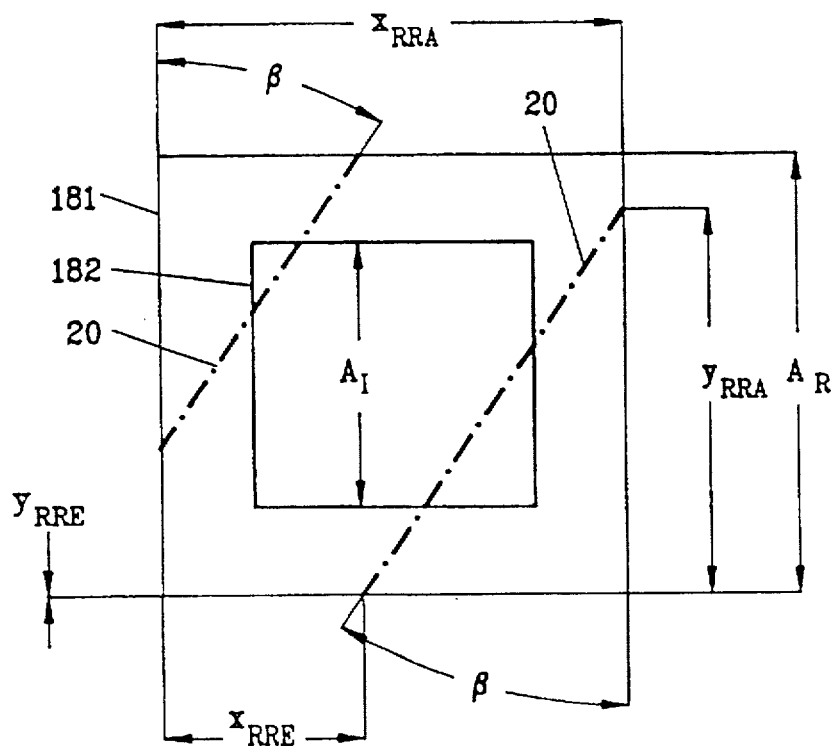
FIG. 33 shows an enlarged illustration of an element in the sequence according to FIG. 32.

FIG. 33 shows the entry coordinates for a reference cell 180 from the sequence in FIG. 32. It is now intended to designate these coordinates $x_{RRE}$ and $y_{RRE}$. Assuming that the reference cell is square, the following relationships then follow using the relationships in this figure for the coordinates $x_{Ron}$ and $y_{Ron}$ at which the laser is switched on:

If $x_{RRE}+((A_R-A_I)/2-y_{REE})*\tan(\beta)<(A_R-A_I)/2$:

$x_{Ron}=(A_R-A_I)/2$ $y_{Ron}=y_{RRE}+((A_R-A_I)/2-x_{RRE})\tan(\beta)$

If $x_{RRE}+((A_R-A_I)/2-y_{RRE})*\tan(\beta)>(A_R-A_I)/2$:

$x_{Ron}=x_{RRE}+((A_R-A_I)/2-y_{RRE})*\tan(\beta)$ $y_{Ron}=(A_R-A_I)/2$

If $x_{RRE}+((A_R-A_I)/2-y_{RRE})*\tan(\beta)=(A_R-A_I)/2$:

$x_{Ron}=(A_R-A_I)/2$ $y_{Ron}=(A_R-A_I)/2$

It likewise follows for the coordinates $x_{Roff}$ and $y_{Roff}$ at which the laser is to be switched off:

If $x_{RRE}+((A_R-A_I)/2-y_{RRE})*\tan(\beta)<(A_R-A_I)/2$ $x_{Roff}=x_{RRE}+((A_R-A_I)/2-y_{RRE})*\tan(\beta)$ $y_{Roff}=(A_R-A_I)/2$ If $x_{RRE}+((A_R-A_I)/2-y_{RRE})*tg(\beta)>(A_R-A_I)/2$:

$x_{Roff}=(A_R+A_I)/2$ $y_{Roff}=y_{RRE}+((A_R+A_I)/2-x_{RRE})\tan(\beta)$

If $x_{RRE}+((A_R-A_I)/2-y_{RRE})*\tan(\beta)>(A_R-A_I)/2$:

$x_{Roff}=(A_R+A_I)/2$ $y_{Roff}=(A_R-A_I)/2$

Engraving is carried out along the helical line 20. Such a helical line 20 lies virtually in the circumferential direction of the stencil, as can be seen by looking at the ratios of the sizes of the geometric parameters (circumference= approximately 600 mm, pitch of the helical line=0.05 to 0.1 mm). Thus, the difference between the length of a helical line 20 and that of the circumference is at most 8.3 mm=8.3*10$^{-6}$ mm. This difference is therefore in an order of magnitude which can be ignored even in the case of very precise gravures. All the section lengths along the helical line 20 can thus be set to the same size as the corresponding circumferential coordinate.

With the above results, it follows for the distance in the circumferential direction during which the laser is to be switched on:

$$DU_{on}=\sqrt{(x_{Roff}-x_{Ron})^2+(y_{Roff}-y_{Ron})^2}$$

The laser is not switched on within a grid cell 21 if either $y_{RRE} \geq (A_R+A_I)/2-(A_R-A_I)/(2*\tan(\beta))$ (Case 1)

or $x_{RRE} \geq (A_R+A_I)/2-(A_R-A_I)/(2*\tan(\beta))$ (Case 2)

In order to calculate the distance in the circumferential direction during which the laser remains switched OFF, the exit coordinates $x_{RRA}$ and $y_{RRA}$ must first be determined.

If $x_{RRE} \geq A_R/\tan(\beta)$ and $y_{RRE}=0$ (Case 3) then, $x_{RRA}=0$ and $y_{RRA}=(A_R-x_{RRE})/\tan(\beta)$ If $x_{RRE}<A_R/\tan(\beta)$ and $y_{RRE}=0$ (Case 4) then, $x_{RRA}=x_{RRE}+A_R*\tan(\beta)$ and $y_{RRA}=A_R$ If $x_{RRE}=0$ and $y_{RRE}<A_R-A_R/\tan(\beta)$ (Case 5) then, $x_{RRA}=A_R$ $y_{RRA}=y_{RRE}+A_R/\tan(\beta)$ Finally If $x_{RRE}=0$ and $y_{RRE} \geq A_R-A_R/\tan(\beta)$ (Case 6) then, $x_{RRA}=(A_R-y_{RRE})*\tan(\beta)$ $y_{RRA}=A_R$ Furthermore, the following applies to the entry coordinates into the next reference cell 180:

If one of the exit coordinates from the previous reference cell 180 is equal to $A_R$, then the corresponding entry coordinate assumes the value zero, in all other cases the entry coordinate has the same magnitude as the exit coordinate from the previous reference cell 180.

The distance in the circumferential direction during which the laser remains switched off is calculated in Case 1 and Case 2 from $$DU_{off}=\sqrt{(x_{RRA}-x_{RRE})^2+(y_{rra}-y_{rre})^2}$$

If these two cases do not apply, then two distances must be determined for the reference cell 180, a first distance from the entry point ($x_{RRE}, y_{RRE}$) into the reference cell 180 to the first intersection point ($x_{Ron}, y_{Ron}$) with the inner border 182 and a second distance from the second intersection point ($x_{Roff}, y_{Roff}$) of the helical line 20 with the inner border 182 to the exit point ($x_{RRA}, y_{RRA}$) of the helical line 20 from this reference cell 180. In this case:

$$DU_{off.1}=\sqrt{(x_{Rin}-x_{RRE})^2+(y_{Rin}-y_{RRE})^2}$$

and $$DU_{off.2}=\sqrt{(x_{RRA}-x_{Roff})^2+(y_{RRA}-y_{Roff})^2}$$

The distances $DU_{on}$ and $DU_{off}$, $DU_{off.1}$ and $DU_{off.2}$ must be added continuously from the zero mark during one revolution of the stencil to be engraved.

If the conditions of Case 1 or 2 are satisfied, then:

$Sum1=Sum2+DU_{off}$ or, if these conditions are not satisfied, then:

$Sum1=Sum1+(DU_{off.1}+DU_{on}+DU_{off.2})$

The distance obtained in this way must be compared with the pulse distance. The pulse distance corresponds to the product of the number of pulses received from the encoder (since the zero mark) and a factor which indicates the length which corresponds to the pulse on the surface of an ideal comparison stencil.

Whenever the pulse distance is greater than Sum1, the distance values $DU_{off.1}$, $DU_{on}$, $DU_{off.2}$ and $DU_{off}$ must be determined for the next grid cell 21 and added to the sum Sum1. In addition, it is necessary to compare whether the instantaneous value of the pulse distance is actually greater than the sum of the value Sum1 formed using the last value $DU_{off.1}$. If this is the case, then the laser must be switched ON. If, in contrast, the pulse distance is greater than the sum value of Sum1 formed using the last value of $DU_{on}$, then the laser must be switched OFF again. The pulse distance, or else simply the number of pulses, furthermore indicates the position of the actually current fine cell 42 within the grey-scale table 7. The grey-shade value entered in this fine cell 42 determines the number of the reference cell and, thus, the value $A_1$ which is to be used for the determination of the coordinates $x_{Ron}, y_{Ron}, x_{Roff}, y_{Roff}$.

Figure 34:
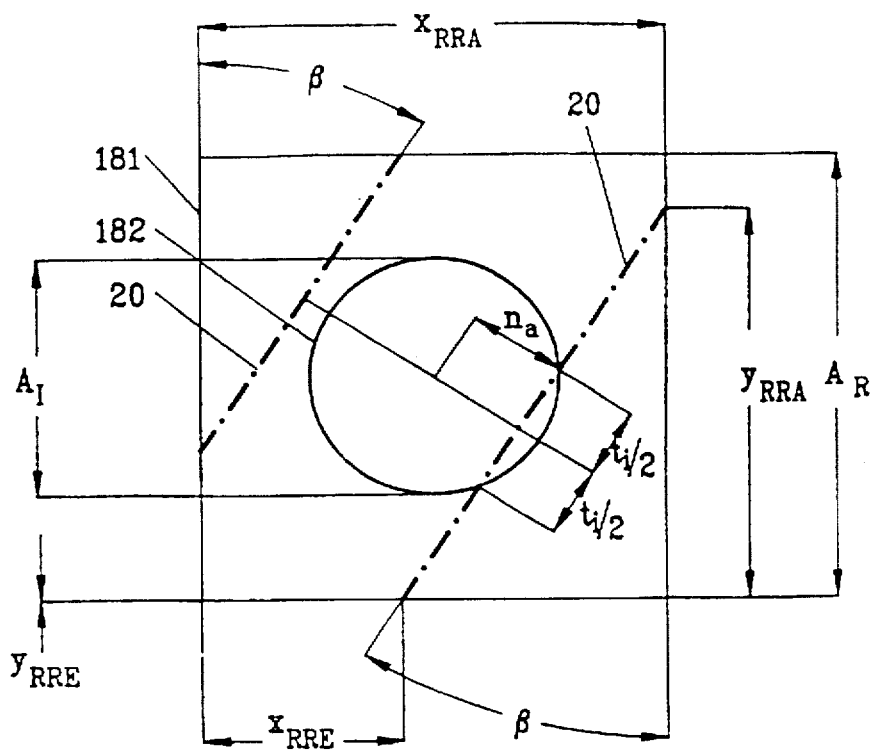
FIG. 34 shows an enlarged illustration of an element of the sequence according to FIG. 31.

In FIG. 34, the entry coordinates $x_{RRE}, y_{RRE}$ of the helical line 20 into the outer border 181 and the exit coordinates $x_{RRA}, y_{RRA}$ thereof from the outer border 181 of the respective reference cell 180 can be determined in the same way as in FIG. 33. The coordinates of the intersections of the helical line 20 with the inner border 182, which is a circle in this case, are determined differently, however. The relationship $n_a=(x_{RRE}-A_R/2)\cdot\cos(\beta)+A_R/2\cdot\sin(\beta)$ applies to the normal distance of the helical line 20 from the center of the circle and, provided $n_a$ is less than $A_R/2$, to half the cord length $$t/2=\sqrt{\left(\frac{A_I}{2}\right)^2-n_a^2}$$

It now follows that:

$x_{Ron}=A_R/2+n_a\cdot\cos(\beta)-t/2\cdot\sin(\beta)$ $y_{Ron}=A_R/2-n_a\cdot\sin(\beta)-t/2\cdot\cos(\beta)$ $x_{Roff}=A_R/2+n_a\cdot\cos(\beta)+t/2\cdot\sin(\beta)$ $y_{Roff}=A_R/2-n_a\cdot\sin(\beta)+t/2\cdot\cos(\beta)$ The distance $DU_{on}$ in the circumferential direction for which the laser is to be switched on now follows in the same way as before in the case of FIG. 33. The laser must not be switched ON in the case of this shape of the reference cell if $n_a$ is greater than $A_R/2$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing a grey-shade stencil comprising the steps of:

superimposing a grey-shade grid on a pattern bounded by edges of which two opposite edges are in contact with each other;

rotating the grid relative to the pattern;

continuously extending the grid over the edges of the pattern which are in contact with one another, said continuously extending including additional fine rotation of the grid; and transferring the pattern into a radiation sensitive base.

2. The method according to claim 1, wherein the radiation sensitive base is a film and the transferring step includes aligning the edges of the pattern with edges of the film.

3. The method according to claim 1, further comprising mounting a covering layer on a blank and using the covering layer as the radiation-sensitive base.

4. The method according to claim 3, wherein the blank is of cylindrical design, and the mounting step includes laying covering layer lies on an outer surface of the blank.

5. The method according to claim 4, wherein the transferring step includes, at least in the circumferential direction of the blank, transferring the pattern, adjacent to itself one or more times, into the radiation-sensitive layer and aligning the edges of the pattern such that successive pattern edges in each case coincide.

6. The method according to claim 1, further comprising electronically designing the pattern and storing the pattern as a grey-scale table.

7. The method according to claim 1, further comprising scanning the pattern in lines or columns by a pattern master and storing at least parts of lines or columns as a grey-scale table.

8. The method according to claim 6, wherein the storing step includes storing the grey-shade grid as a two-dimensional grey-scale table.

9. The method according to claim 7, wherein the storing step includes storing the grey-shade cell as a two-dimensional grey-scale table.

10. The method according to claim 6, further comprising:

composing the grey-scale table of grey-shade cells which contain a grey-shade value of the pattern for in each case one pattern area assigned to it;

the transferring step includes illuminating the radiation-sensitive base with a beam along a path reading out grey-shade values of those grey-shade cells which lie along a corresponding path through the grey-scale table;

comparing the grey-shade value which has in each case been read from a grey-shade cell with at least one reference grey-shade value which is contained in one of the reference cells, that is assigned to the grey-shade cell, of the grid which is superimposed on the grey-scale table or on the pattern; and switching the beam ON and OFF as a function of the comparison result.

11. The method according to claim 10, further comprising dividing the grey-shade cells into fine cells and comparing grey-shade values of the fine cells with the reference grey-shade value.

12. The method according to claim 11, wherein the dividing step is not performed until the grey-shade cell which is to be read out for the exposure of the radiation-sensitive base is called up.

13. The method according to claim 11, further comprising predetermining the grey-shade values of the fine cell as a function of the grey-shade values of fine cells of at least one adjacent grey-shade cell, or as a function of the grey-shade value of at least one adjacent grey-shade cell.

14. The method according to claim 10, further comprising comparing each grey-shade value with a sequence of reference grey-shade values.

15. The method according to claim 10, further comprising constructing the reference cell of individual cells, at least some of which contain different reference grey-shade values.

16. The method according to claim 15, wherein the reference grey-shade values rise or fall in a spiral shape from the edge of the reference cell towards its center.

17. The method according to claim 15, wherein the constructing step incudes constructing the reference cell of groups of at least a plurality of individual cells which contain the same reference grey-shade values in groups.

18. The method according to claim 15, further comprising determining the coordinates of the individual cells of the reference cell by linear transformation of the coordinates of the grey-shade cells or the coordinates of the fine cells.

19. The method according to claim 10, further comprising forming the grid from grid cells which may be added and are in each case located within a reference cell which is larger than the grid cell.

20. The method according to claim 1, wherein the transferring step includes using a beam of a laser for transferring the pattern into the radiation-sensitive base.

21. A method for producing a grey-shade stencil comprising:

superimposing a grey-shade grid on a pattern bounded by edges of which two opposite edges are in contact with each other;

continuously extending the grid over the edges of the pattern which are in contact with one another, said continuously extending including at least one of compressing and stretching the grid; and transferring the pattern into a radiation sensitive base.

22. The method according to claim 21, further comprising rotating the grid relative to the pattern.

23. The method according to claim 22, the continuously extending step provides additional fine rotation to the grid.

24. The method according to claim 21, wherein the compressing or stretching of the grid is different in different directions of the pattern.

25. An apparatus for producing a grey-shade stencil comprising:

means for superimposing a grey-shade grid on a pattern bounded by edges of which two opposite edges are in contact with each other;

means for continuously extending the grid over the edges of the pattern which are in contact with each other;

means for rotating the grid relative to the pattern;

means for providing additional fine rotation to the grid; and means for transferring the pattern into a radiation sensitive base.

26. The apparatus according to claim 25, wherein said means for transferring includes using a laser emitting a beam which transfers the pattern into the radiation-sensitive base.

27. An apparatus for producing a grey-shade stencil comprising:

means for superimposing a grey-shade grid on a pattern bounded by edges of which two opposite edges are in contact with each other;

means for continuously extending the grid over the edges of the pattern which are in contact with each other, including at least one of means for compressing the grid and means for stretching the grid; and means for transferring the pattern into a radiation sensitive base.

28. The apparatus according to claim 27, further comprising means for rotating the grid relative to the pattern wherein said means for continuously extending includes means for providing additional fine rotation to the grid.

* * * * *